(12) United States Patent
Zaborowski

(10) Patent No.: US 8,471,689 B2
(45) Date of Patent: Jun. 25, 2013

(54) TOUCH-SENSITIVE MOTION DEVICE

(76) Inventor: Philippe Stanislas Zaborowski, Nepean (CA)

(*) Notice: Subject to any disclaimer, the term of this patent is extended or adjusted under 35 U.S.C. 154(b) by 895 days.

(21) Appl. No.: 12/599,835

(22) PCT Filed: May 11, 2007

(86) PCT No.: PCT/CA2007/000827
§ 371 (c)(1),
(2), (4) Date: Nov. 12, 2009

(87) PCT Pub. No.: WO2008/138093
PCT Pub. Date: Nov. 20, 2008

(65) Prior Publication Data
US 2010/0302016 A1   Dec. 2, 2010

(51) Int. Cl.
*G08B 6/00* (2006.01)
(52) U.S. Cl.
USPC .......................... 340/407.2; 345/156; 345/157

(58) Field of Classification Search
USPC ................................. 340/407.2; 345/156, 157
See application file for complete search history.

(56) References Cited

U.S. PATENT DOCUMENTS

2009/0153374 A1* 6/2009 Maw ................................ 341/27
2009/0225046 A1* 9/2009 Kim et al. ...................... 345/173

* cited by examiner

*Primary Examiner* — Daryl Pope
(74) *Attorney, Agent, or Firm* — Freedman & Associates

(57) ABSTRACT

A method of entering data to an electronic device is outlined using a modified touch-pad. The touch-pad is modified to include the addition of surface features, which provide distinguishable tactile feedback to the user allowing improved spatial resolution of the positioning of an object onto the surface of the touch-pad. In this manner the touch-pad allows the user to select from multiple positions across the surface of the touch-pad, the outcomes of each position being optionally different, such as alphanumeric character selection.

22 Claims, 20 Drawing Sheets

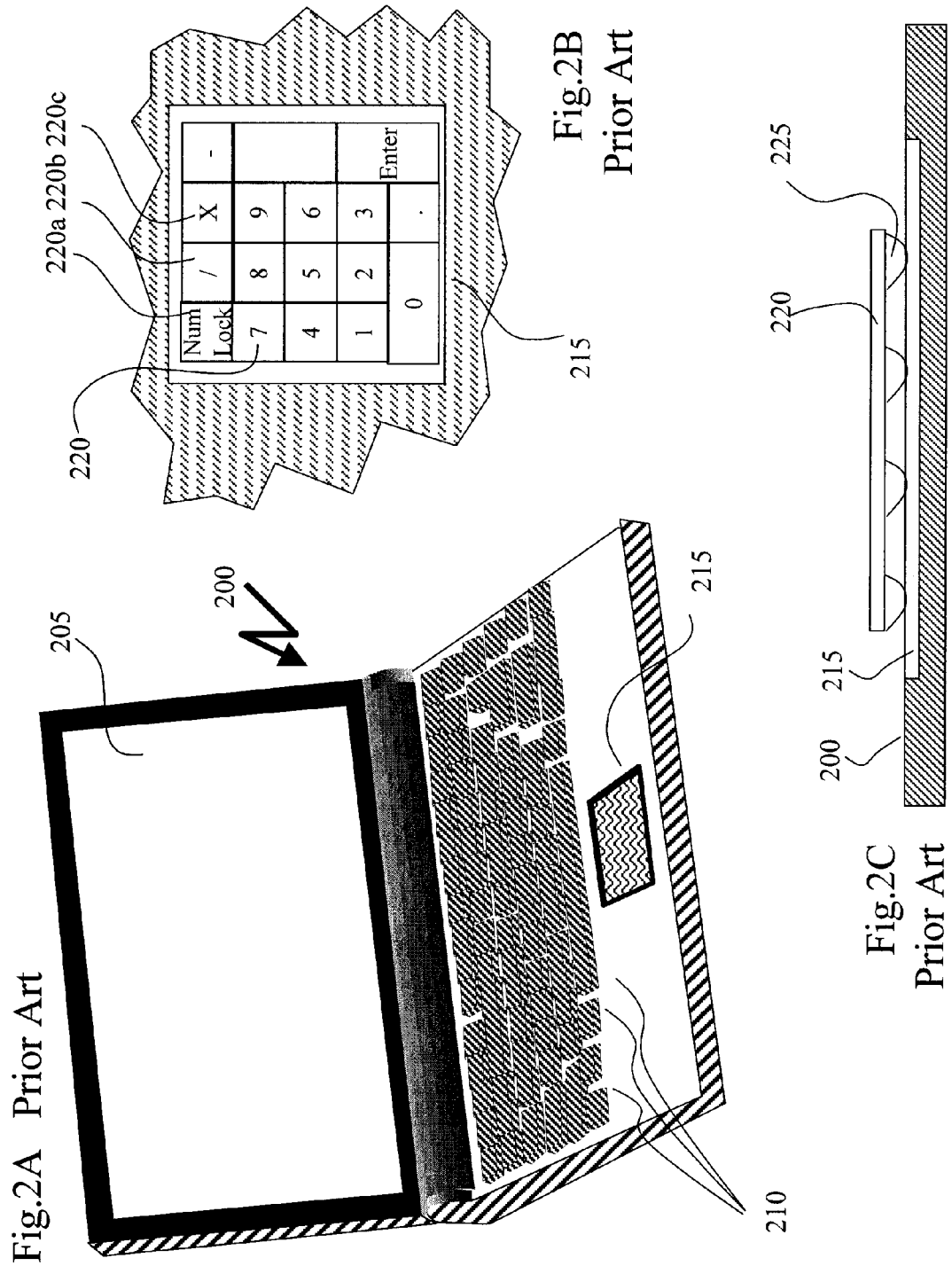

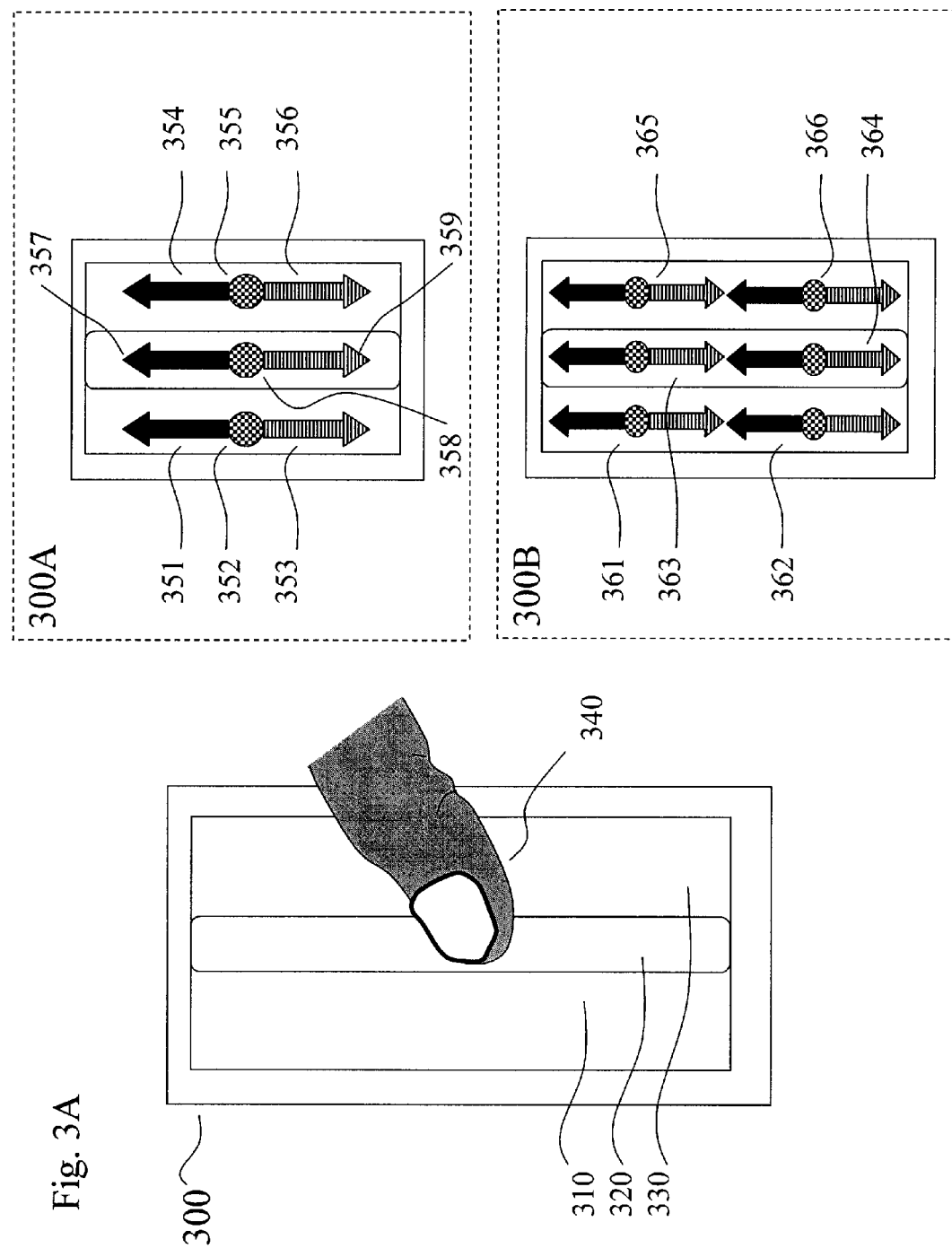

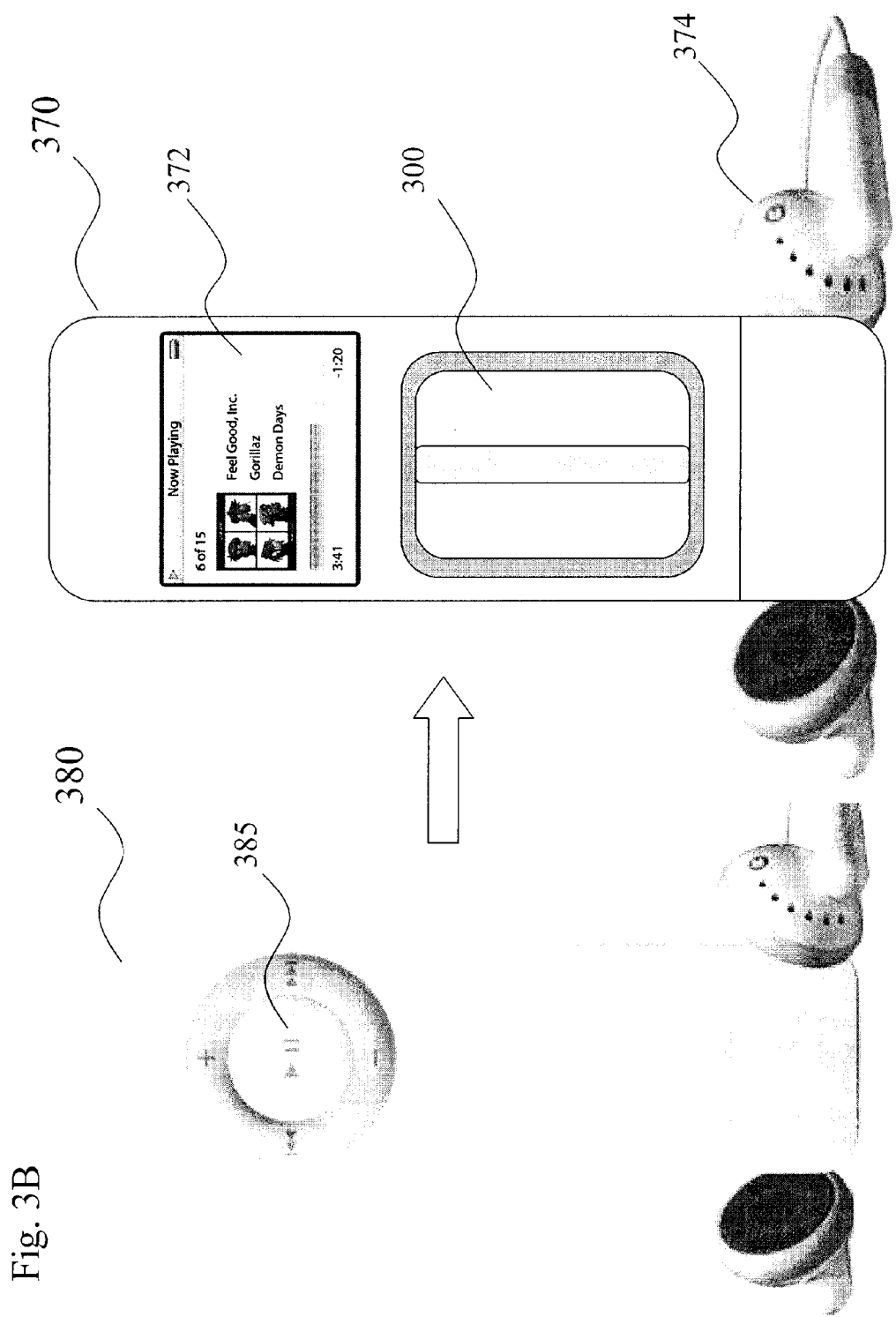

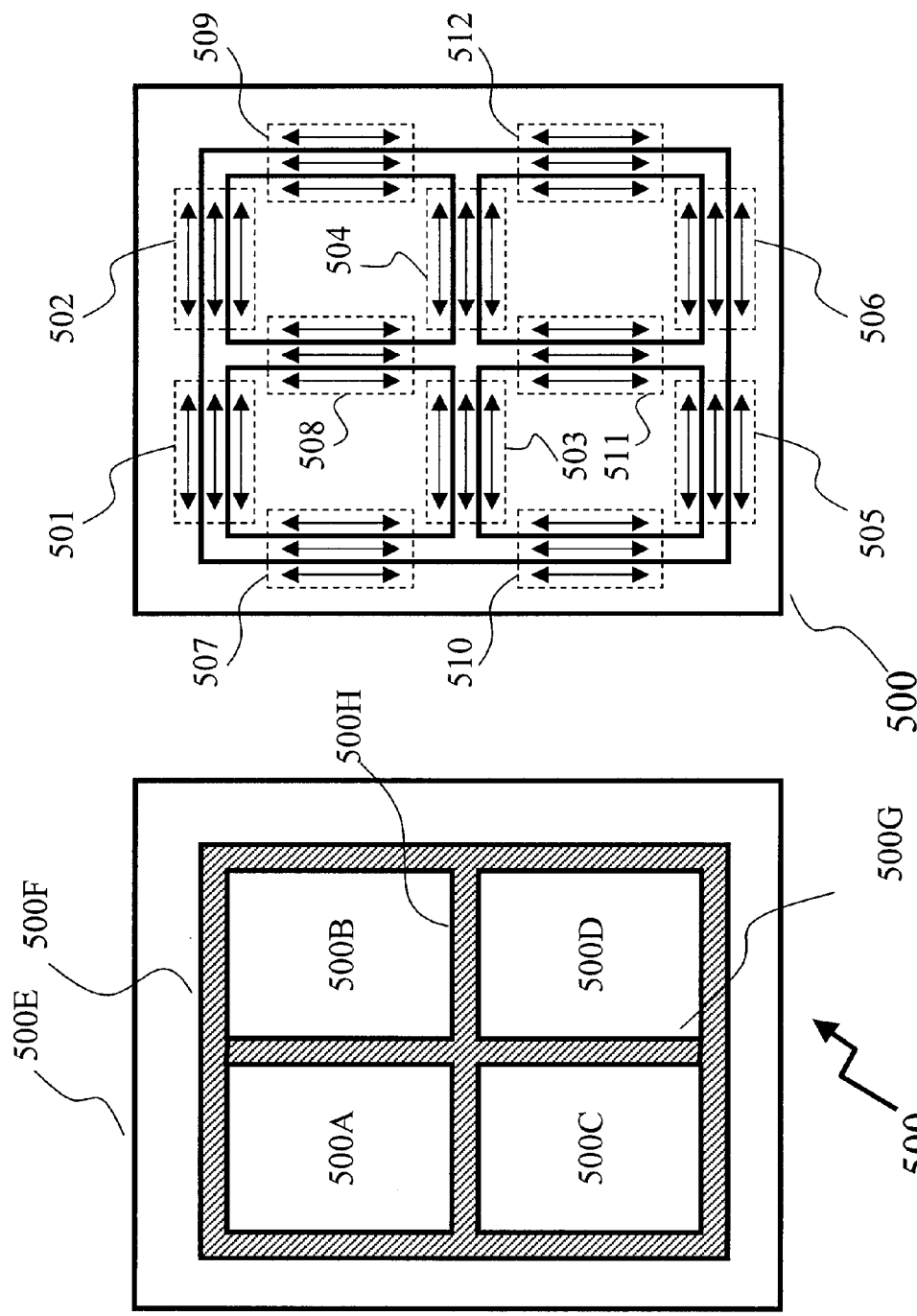

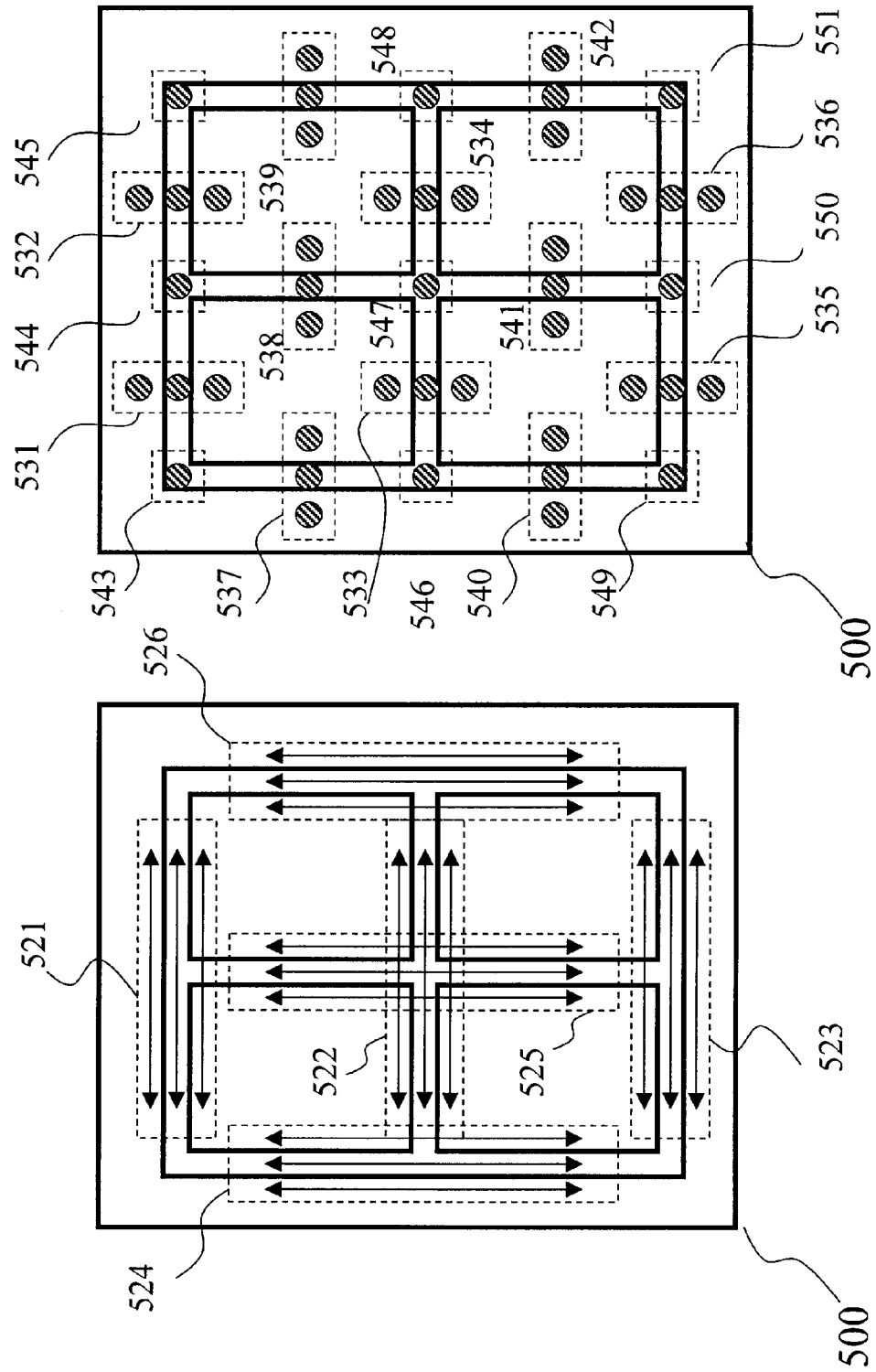

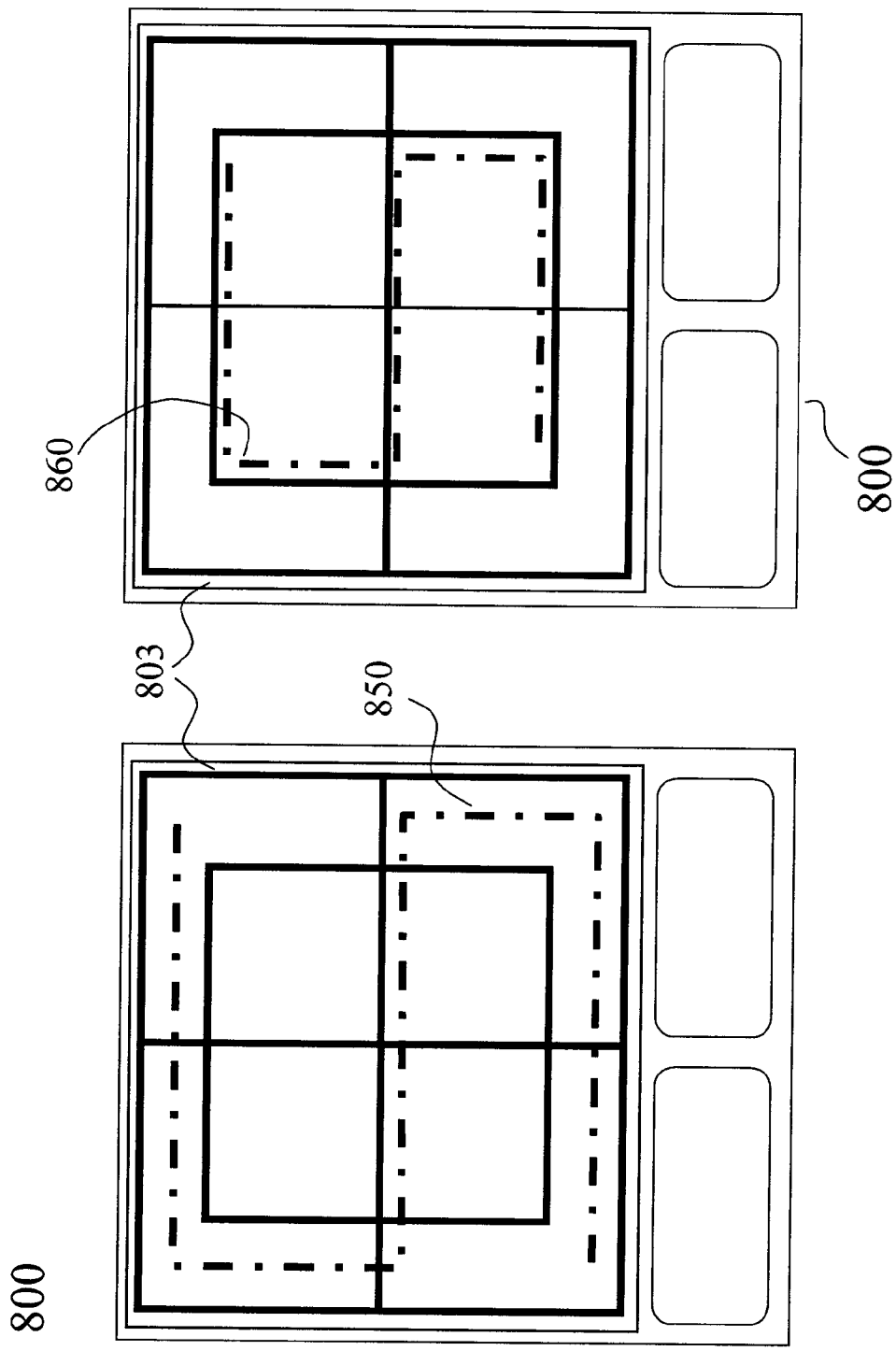

TOUCH-SENSITIVE MOTION DEVICE

FIELD OF THE INVENTION

The invention relates to the field of touch-sensitive motion devices for electronic devices.

BACKGROUND OF THE INVENTION

The wide variety of consumer electronics devices available today such as, home computers, laptop computers, cellular telephones, personal data assistants (PDA) and personal music devices such as MP3 players rely upon microprocessors. Advances in the technology associated with microprocessors have made these devices less expensive to produce while improving their quality and increasing their functionality. Despite the improvements in microprocessors the physical user interfaces that these devices use have remained relatively unchanged over the years. Thus, while it is not uncommon for a home computer to have a wireless keyboard and mouse, the keyboard and mouse are quite similar to keyboards and mice commonly available a decade ago.

Cellular telephones and PDAs rely upon keypads that are functionally similar to those of analogous devices used many years ago. As the functions that PDAs support are now relatively complex the keypads that they support increasing have more keys. This represents a design constraint as the size of individual PDAs is reduced while the number of keys increases to the extent that users of these devices often have difficulty pressing desired keys on the keypad without pressing undesired keys. In some cases, the designers of cellular telephones have avoided this problem by limiting the number of keys on the keypad while associating specific characters with the pressing of a combination of keys. Due to its complexity, this solution is difficult for many users to learn and use.

In many instances the keypad and keyboard solutions for entering data are impossible for the user to access either through disabilities which can include visual impairment, motion impairment, or simply protective equipment for the environment they are working in.

The touch-pad, in the past decade has become common to laptops and palmtops as a means of removing the requirement for a separate mouse, such that motion of the users' finger provides for motion across the screen and a single tap selects a predetermined function. In laptops and palmtops this feature allows the user to move the cursor without the need for a physical supporting surface for a mouse, or adding a tracker ball or other element to the computer.

As originally contemplated, and subsequently implemented, for example in 1994 by Gerpheide (U.S. Pat. No. 5,305,017), and in 1995 by Boie et al (U.S. Pat. No. 5,463,388), the touch-pad is based upon the use of thin film materials to provide a means to detect a localized change in the electrical characteristics of the distributed electrical surface. As such the touch-pad allows for a user to provide control input signals based solely upon the motion of a users finger allowing the touch-pad to be easily deployed as a replacement for the computer mouse.

There has been relatively limited development of the touch-pad further in terms of capabilities and functionality. Amongst the limited development has been that of Holehan (U.S. Pat. No. 5,887,995) and Manser et al (U.S. Pat. No. 6,388,660). Holehan discloses the merging of a typical calculator or telephone keypad with a touch-pad, and as such presents a device wherein the traditional array of electrical contacts, one per key, is replaced with a touch-pad. However, the upper surface is now essentially the same flexible molded multiple key surfaces as seen on calculators and telephones. Manser takes the concept one step further by allowing for multiple membranes to be placed over the touch pad allowing the functionality to be adjusted from say calculator to mouse.

However, these require additional elements above and beyond the touch-pad, and are generally are designed to replicate traditional entry formats such as calculator keypads, and to be presented in a form and position typical of today's computer deployed touch-pads. A decade of development still offers us small flat rectangular touch-pads on a laptop with simple motion and single tap differentiation. It would therefore be advantageous to provide an interface for an electronic device which not only provided for a dynamic allocation of function, so that it can perform as numeric keypad, text keypad, pointing device and switch for example, but did so in a manner that facilities the integration of such a device into any small, lightweight and inexpensive electronic device.

SUMMARY OF INVENTION

In accordance with the invention there is provided an apparatus for providing data input signals to an electronic device. The data input signals being derived from a pad, the pad for receiving a user selected input signal, the pad also having at least a surface element being part of the surface of the pad, the surface element providing a distinguishable feedback to the user. The pad generating the data input signal in response to the user input signal; the user input signal being at least an object's position in relation to the surface of the pad; wherein the object is controlled by a user.

In accordance with another embodiment of the invention there is provided a method for entering data to an electronic device comprising:

providing a pad for receiving a user input signal, providing a surface element, the surface element being part of the surface of the pad, the surface element providing a distinguishable feedback to the user;

generating the data input signal in response to the user input signal; the user input signal being at least an object's position in relation to the surface of the pad; wherein the object is controlled by a user.

In accordance with another embodiment of the invention there is provided a computer readable medium having stored therein data according to a predetermined computing device format, and upon execution of the data by a suitable computing device an apparatus for providing data input signals to an electronic device is provided. The data input signals being derived from a pad, the pad for receiving a user selected input signal, the pad also having at least a surface element being part of the surface of the pad, the surface element providing a distinguishable feedback to the user. The pad generating the data input signal in response to the user input signal; the user input signal being at least an object's position in relation to the surface of the pad; wherein the object is controlled by a user.

In accordance with another embodiment of the invention there is provided a computer readable medium having stored therein data according to a predetermined computing device format, and upon execution of the data by a suitable computing device a method of providing data input signals to an electronic device is provided, comprising:

providing a pad for receiving a user input signal, providing a surface element, the surface element being part of the surface of the pad, the surface element providing a distinguishable feedback to the user;

generating the data input signal in response to the user input signal; the user input signal being at least an object's position in relation to the surface of the pad; wherein the object is controlled by a user.

BRIEF DESCRIPTION OF THE DRAWINGS

Exemplary embodiments of the invention will now be described in conjunction with the following drawings, in which:

FIG. 2A illustrates a typical prior art laptop with touch-pad and numeric keys as part of one row of keyboard;

FIG. 2B illustrates a typical prior art numeric overlay for a touchpad;

FIG. 2C illustrates a cross-section of a prior art pressure contacting overlay for a touchpad;

FIG. 3A illustrates a first embodiment of the invention wherein a touch-pad is provided for text entry and scrolling functions only;

FIG. 3B illustrates an exemplary incorporation of a touch-pad according to FIG. 3A into a typical MP3 player;

FIG. 5A illustrates a second embodiment of the invention.

FIG. 5B illustrates the possible 72 short entry strokes for a touch-pad according to the second embodiment of the invention in FIG. 5A;

FIG. 5C illustrates the possible 36 long entry strokes for a touch-pad according to the second embodiment of the invention in FIG. 5A;

FIG. 5D illustrates the possible 45 tap entry strokes for a touch-pad according to the second embodiment of the invention in FIG. 5A;

FIG. 8B illustrates the finger motion for a user entering an upper-case "S" into the electronic device via motion on the keypad of FIG. 8A;

FIG. 8C illustrates the finger motion for a user entering a lower-case "s" into the electronic device via motion on the keypad of FIG. 8B;

DETAILED DESCRIPTION OF EMBODIMENTS OF THE INVENTION

Figure 1B:
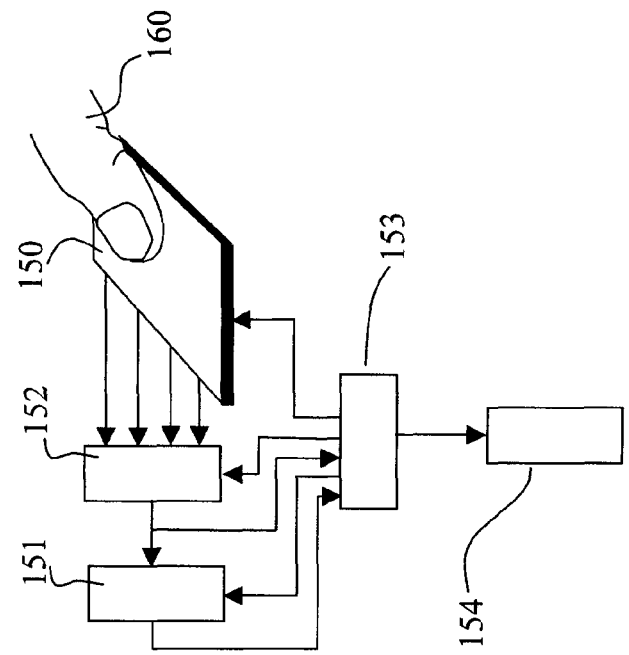
FIG. 1B illustrates the typical prior art interface from the touch-pad and finger to the electronic device digital control signals.
Figure 1A:
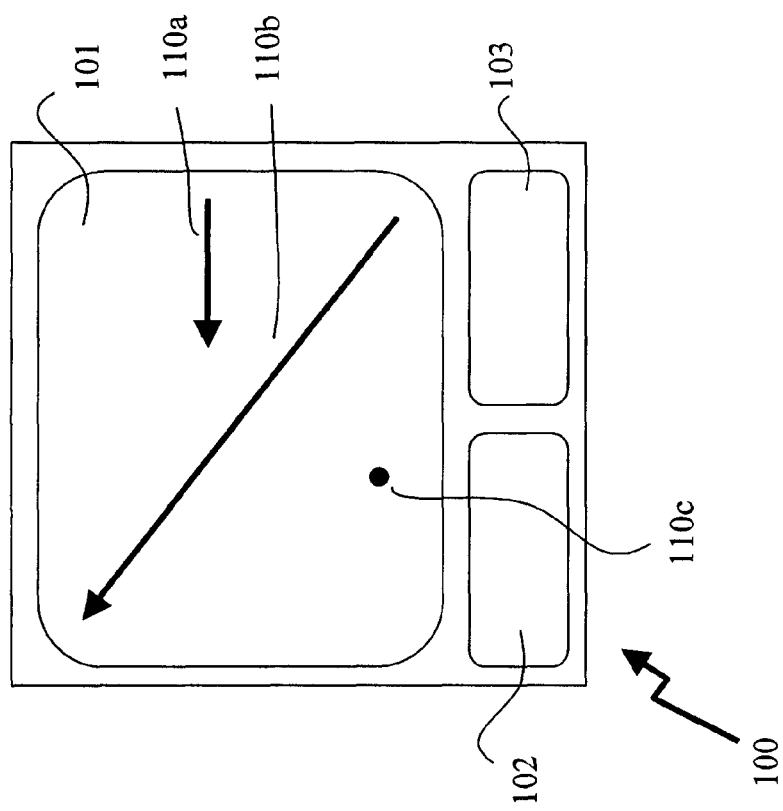
FIG. 1A illustrates a typical prior art touch-pad for providing cursor motion.

FIG. 1A illustrates a typical prior art touch-pad for receiving a user input signal in the form of a single function selection from a tap motion. As such the figure depicts a touch-pad typically encountered by today's user on laptop computers and palm-top computers.

Shown is a touch-pad element 100 which would be part of the top-keyboard surface of a computer. The touch-pad typically comprising touch-pad surface 101 and two buttons 102 and 103. Buttons 102 and 103 are typically enabled to replace the buttons on a typical computer mouse.

Touch-pad sensors integrated into the touch-pad surface 101 detect contact of the users' finger. This contact is used to determine a relative motion of the user's finger, such as: a short lateral stroke 110a, a large directional motion 110b, or a tap 110c. According to the application currently loaded on the computer and the previous series of entered keystrokes the touch-pad actions 110a to 110c can have different results on the action undertaken by the computer.

FIG. 1B illustrates the typical prior art interface from the touch-pad and finger to the electronic device digital control signals. As shown the users finger 160 is in contact with a touch-pad 150. The touch-pad surface 150 having a plurality of electrical contacts which are interfaced to an electrical balance circuit 152, such that the position of the user's finger 160 onto the touch-pad surface 150 results in a change in the electrical balance of several contacts fed to the electrical balance circuit 152.

The output port of the electrical balance circuit 152 is electrically coupled to a balance ratio determination circuit 151 and control circuit 153. The balance ratio determination circuit 151 provides for establishing the relative position of the finger within the activated segment of the touch-pad surface 150. The control circuit 153, therefore, determines the position and motion of the conductive "point" allowing the distinction of the motions and actions 110a to 110c of FIG. 1A. The output port of the control circuit 153 is then coupled to a utilization circuit 154, which provides the positional and directional information determined by the control circuit 153 to the electronic device within which the touch-pad is integrated or attached (not shown for clarity).

FIG. 2A illustrates a typical prior art laptop computer 200 with touch-pad 215 and alphanumeric keys 210. Shown is a laptop computer 200, which presents information to a user through the screen 205. User selected input information is normally entered via the alphanumeric keys 210, which are provided in typical laptop computers for entry of text characters and common punctuation marks as well as functions such as home, end, and tab. Typically the numeric keys 0-9 are displayed as a single row within the keyboard keys 210 on laptops and palmtops as the demand is for smallest footprint of the machine with ease of use of the user. The additional functions of plus (+), minus (−), equals (=) being combinations of direct single key and dual-key entries, the decimal point being the normal period keystroke (.), which is generally three rows displaced from the numeric keys. The result is entry of numeric data in a format that is not normally associated by a user with such entry via a calculator keyboard or the keyboard of a desktop computer, which due to relaxed space requirements has a keypad located additionally.

In FIG. 2A the touch-pad 215 presents, as shown, the normal functions of replacing external peripheral devices such as mouse or tracker-ball allowing the user to move the cursor rapidly around the screen.

FIG. 2B illustrates a typical prior art numeric overlay for a touch-pad 215. Here a keypad membrane 220 has been placed over the touch-pad surface 215. The keypad membrane 220, as shown in this exemplary embodiment, is a numeric keypad as commonly found on a calculator. The keypad membrane 220 is printed to mimic the keys of a typical calculator such as shown by membrane keys 220a to 220c.

FIG. 2C illustrates a cross-section of a prior art keypad membrane 220 overlay for a touch-pad surface 215. Under each discrete "key" 220a to 220c, which has been printed to mimic a key is a membrane bump 225 which restricts the applied force from a key 220a to 220c to a more limited portion of the surface of the touch-pad 215. In this manner, the application of pressure to one of the discrete keys 220a to 220c is transferred to the touch-pad surface 215 in a more controlled and definite manner.

Figure 2D:
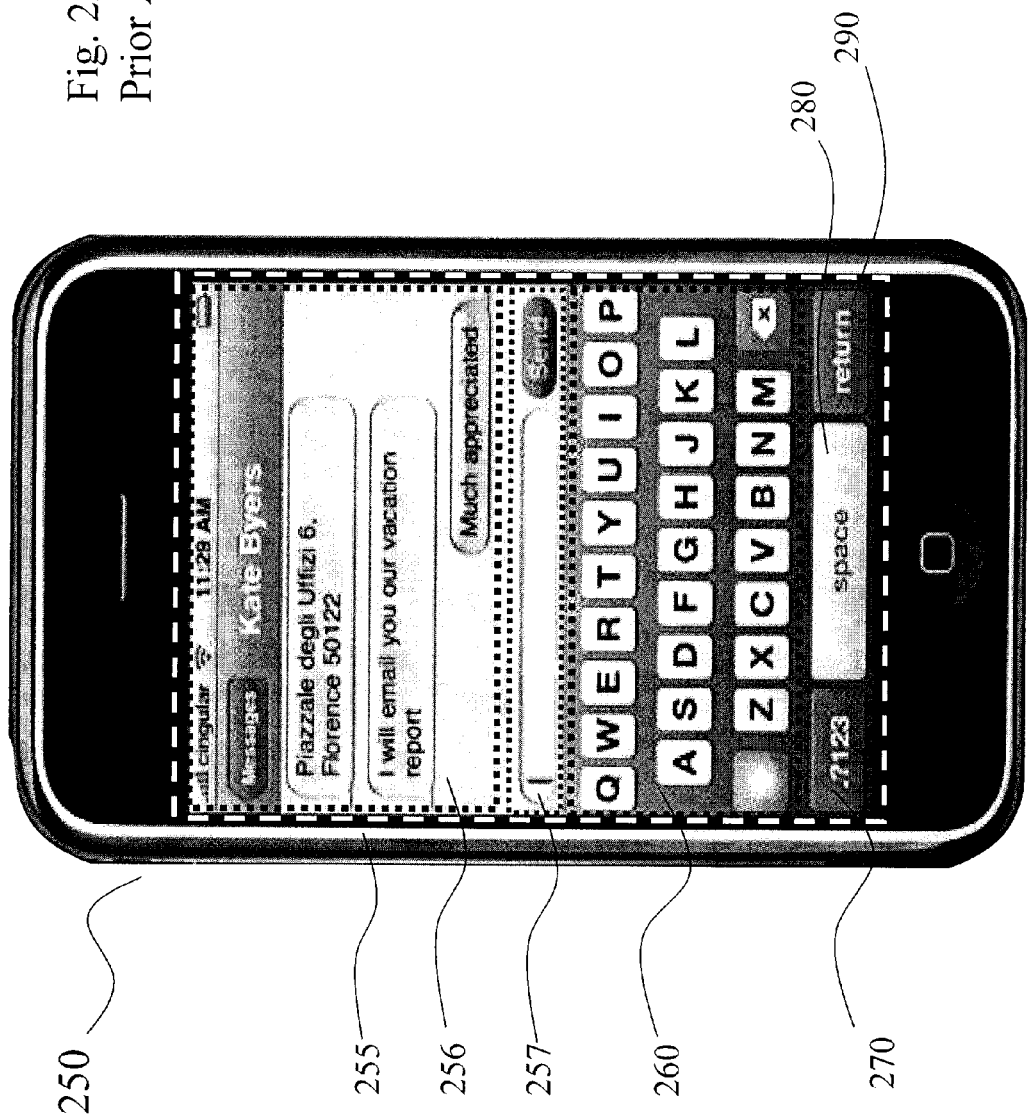
FIG. 2D illustrates a text entry approach of a current state-of-the-art portable multi-media device.

An alternate approach with touchpad entry is shown in respect of FIG. 2D where a current state-of-the-art portable multi-media device. Shown is an Apple® iPhone™ 250 that combines a mobile (cellular) telephone, a widescreen iPod™ MP3 player, and an Internet communications device with email, web browsing, maps, and search capabilities. As shown the iPhone™ 250 is operating as the Internet communication device and shows upon its liquid crystal display (LCD) 255 showing an email screen 256 displaying two emails from a contact "Kate Byers" and an email composition window 257. In operation the user "types" onto the QWERTY keyboard portion 260 of the LCD display 255, their "typing" guided by the displayed letters laid out as per a conventional QWERTY keyboard.

In order to enter a space the user touches the "SPACE" 280 region of the LCD display 255, and for a carriage return (new line or linefeed) the user touches the portion of the LCD display 255 highlighted as "RETURN" 290. In order to enter a number or other alphanumeric characters such as "*", "(", "&" and "?", the user first selects the "?123" 270. Upon selection of this portion of the LCD display 255 the "QWERTY" keyboard portion 260 displays a new screen, not shown for clarity, rather than the alphabet that comprises the numerals 0-9 and special characters.

As is evident, this approach mimics an existing keypad to a touch-pad such that the touch-pad replaces the usual array of physical make/break contacts of a traditional keypad or keyboard. As such this current state-of-the-art iPhone™ 250 requires the user to be viewing the multiple elements of the LCD display 255.

A single feature touch-pad 300 according to a first embodiment of the invention is shown in FIG. 3A wherein wide surface feature 320 which in addition to providing the user of the touch-pad 300, who is not shown for clarity, with tactile feedback also provides for "stroke" entry. As shown the wide surface feature 320 forms part of the touch pad 300 and divides this into a left-section 310 and right section 330.

In the single feature touch-pad 300 the wide surface feature 320 differs from the single surface features 320 in that it is implemented with a width sufficient to support distinguishable sensing motion of the finger 340 in addition to providing the physical feedback to the user in respect of their finger 340 relative to the single feature touch-pad 300. Using the single feature touch-pad 300 a user enters "strokes" according to "long-strokes" depicted pictographically in first stroke array 300A, and "short-strokes" depicted pictographically in second stroke array 300B.

In the first stroke array 300A the users finger 340 provides "long-strokes" resulting in three entries within the left section 310, the first entry being first "tap" 352, and the second and third entries being the first up-stroke 351 and first down-stroke 353. Motion within right section 330 provides second "tap" 355, second up-stroke 354 and second-down stroke 356. Similarly, motion of the users' finger 340 on the feature 320 provides third "tap" 358, third up-stroke 357 and third down-stroke 359. In this manner, 9 entries are achieved using the "long-strokes" within first stroke array 300A.

With the second stroke array 300B the users finger 340 provides "short-strokes" resulting in six entries within the left section 310, formed from upper left stroke group 361 and lower left stroke group 362. Each of the upper and lower left stroke groups 361 and 362 respectively being provided from a "tap", similar to first "tap" 352, up-stroke, similar to first up-stroke 351 but of reduced motion, and a down-stroke, similar to first down-stroke 353 but of reduced motion. Similarly "short-stroke" motion in the right section results in a further six entries, formed from upper right stroke group 365 and lower right stroke group 366.

Finally, motion of the users finger 340 with similar "short-stroke" motion in the feature section 320 results in a further six entries, formed from upper middle stroke group 363 and lower middle stroke group 364. These result in a total of 18 "short-stroke" entry motions, and 9 "long-stroke" entry motions for the single feature touch-pad 300. As a result these 27 strokes overall provide all 26 alphabet characters and the "space" special character. Such a character set being generally sufficient to search for a specific song even within current high capacity MP3 players such as the 80 Gb Apple® iPod™ that holds approximately 20,000 songs.

Such an Apple® iPod™ 380 is depicted in FIG. 3B with its typical current state-of-the-art search tool, being a 5-button switch pad 385, for the Apple® iPod™ 380, and other MP3 players not shown for clarity, along with an improved MP3 player 370 featuring a single-feature touch pad 300 according to the invention described in respect of FIG. 3A. As shown in FIG. 3B the current state-of-the-art Apple® iPod™ 380 has typical dimensions of only a couple of inches in height, although some MP3 players such as the iPod™ Shuffle, not shown for clarity, are only just over an inch high, an inch or just over in width and thickness of approximately half and inch. As such fitting a keyboard is impractical due to the limited space making operation with a finger difficult under even near perfect conditions of the user sitting still with the Apple® iPod™ 380 but essentially impractical when normally employed with gloves, jogging or otherwise. The user interface in this case being a simple 5 button switch-pad 385 which allows the user to skip forwards, skip backwards, play, pause, and increase or decrease the volume. Obviously such a skip feature being tedious if a user wishes to find a specific song to play to a friend, or simply hear, especially if the MP3 player holds thousands of songs.

As such a touch-pad such as the single feature touch-pad 300 as described in respect of FIG. 3A provides a substantial enhancement in functionality to the user when embedded into a searchable MP3 370. As shown the searchable MP3 370 provides audio output via a pair of headphones 374 to a user, although the audio output is optionally provided via a docking station to loudspeakers, a computer, or via FM transmitter to a conventional radio thereby providing the user with a single storage for their audio that is playable in most environments. The searchable MP3 370 features a small LCD display 372 showing the current song playing, or in the event of searching the current songs matching the portion of text entered, and the single feature touch-pad 300. As such in operation the user may start entering the name of an artist or track, wherein the internal processor of the searchable MP3 370 performs a matching of the entered text versus song titles, artists or other aspects of the stored information.

Figure 4A:
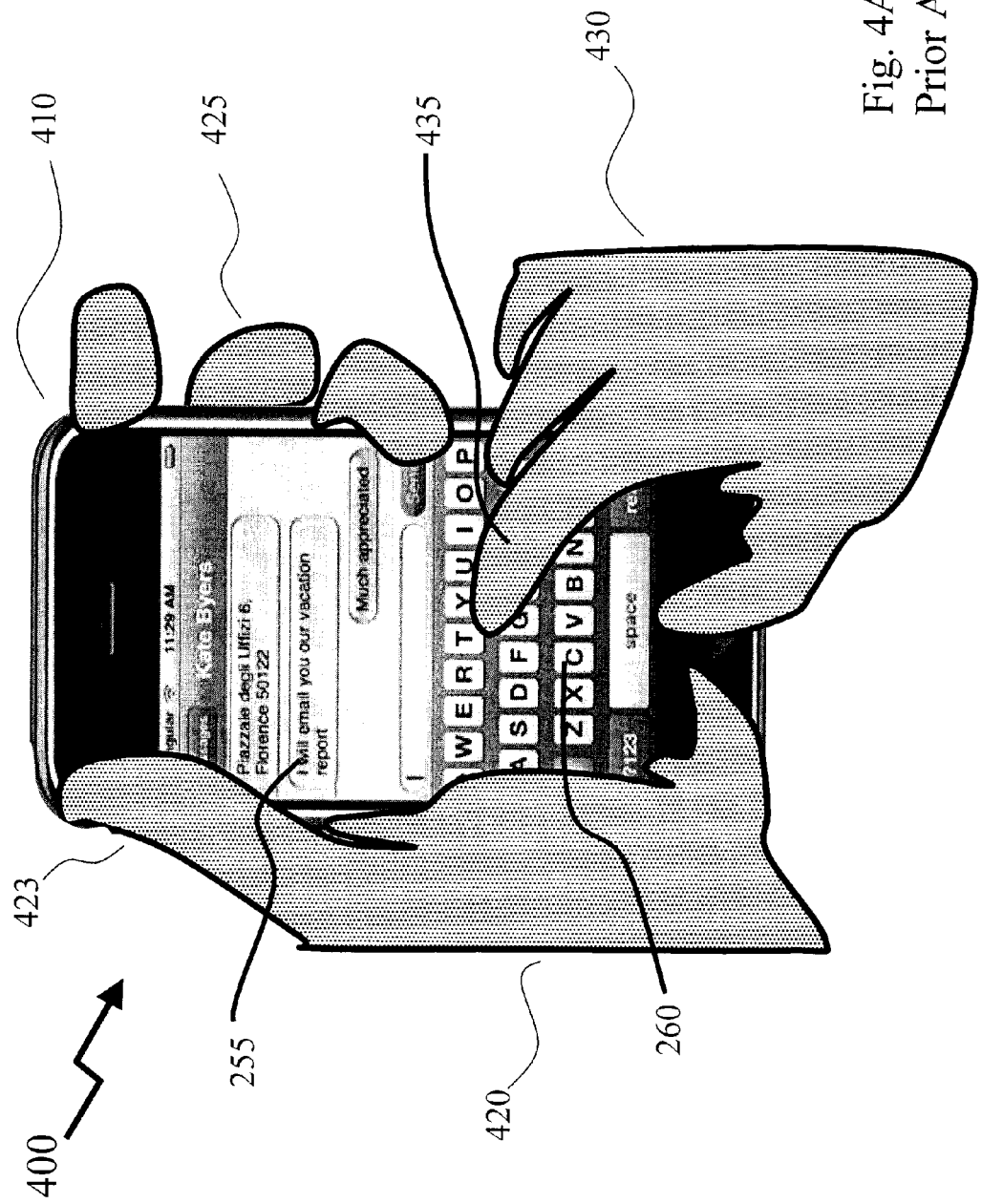
FIG. 4A illustrates a typical entry mode for text for the current state-of-the-art portable multi-media device according to FIG. 2D.

Whilst the first embodiment described in respect of FIG. 3B for the single feature touch-pad 300 is a highly compact searchable MP3 370 the approach enables increased functionality, enhanced ergonomics and features to other electronic devices. As such, consider a state-of-the-art personal data analyzer (PDA) 410, being similar to the iPhone™ 250 of FIG. 2D, as depicted within a typical user scenario 400 in FIG. 4A. As shown the user holds the PDA 410, not shown completely for clarity, within their left hand 420 such that it is gripped within their fingers 425 and thumb 423. The user is shown typing onto the QWERTY keyboard portion 260 of the LCD display 255 using a digit 435 of their right hand 430.

Figure 4B:
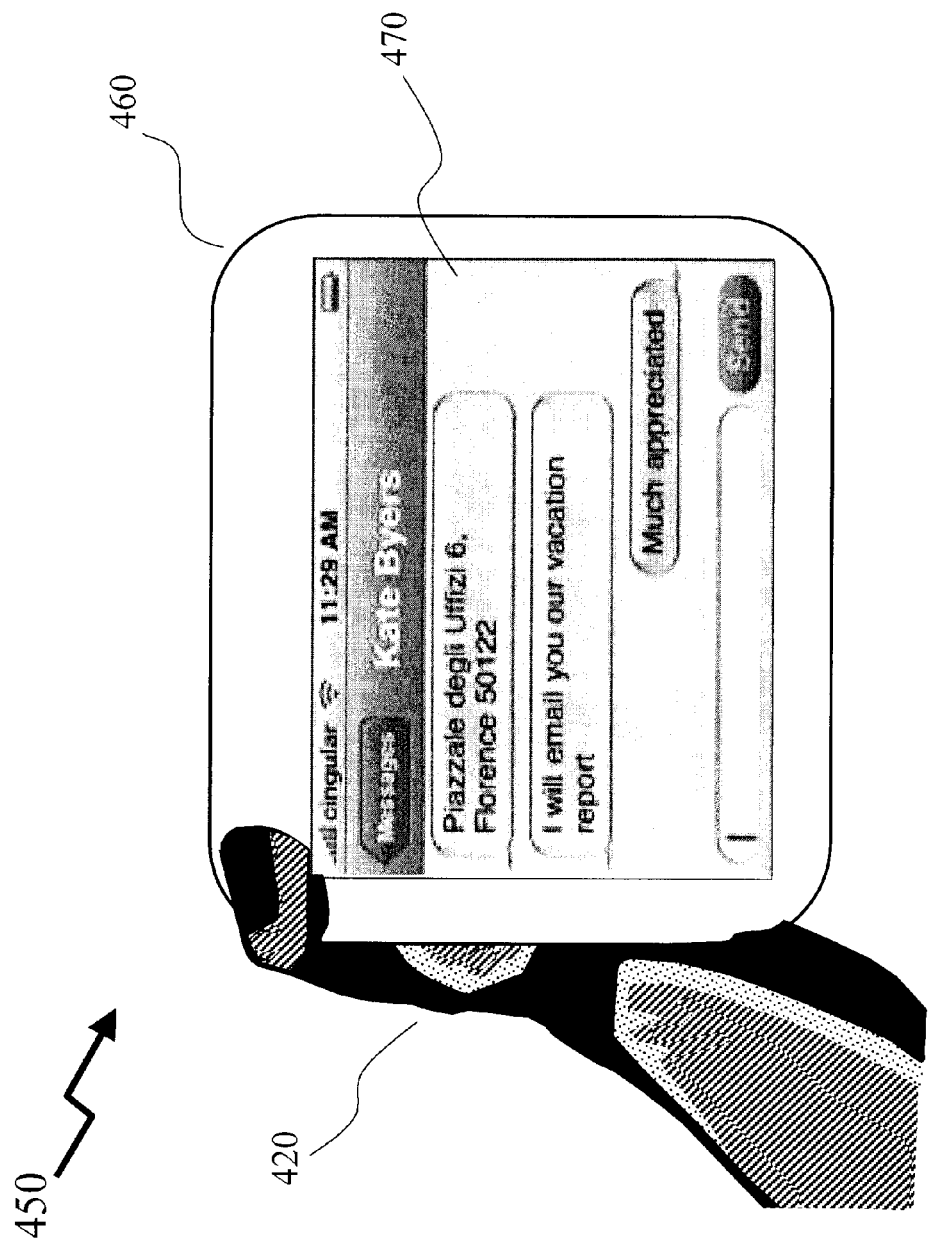
FIG. 4B illustrates a user viewing a screen of an exemplary PDA employing a text entry means according to a first embodiment of the invention.

It will be apparent that the customers' desire for a small compact device, such as the PDA 410, conflicts with the same customers desire for a large display, clear large text, and a keyboard that provides easy typing with an average individuals index finger or thumb, which tend to be quite large. As such there is a benefit in decoupling the keyboard, such as QWERTY keyboard portion 260, from the display, such as LCD display 255. Whilst physically separated on many commercial devices the users are generally not "touch typists" who navigate the keyboard instinctively, and hence both the display and keyboard are visible to the user. It would therefore be advantageous to leverage a touch-pad, such as the single feature touch-pad 300, into consumer devices allowing the designer to provide alternate ergonomics and design flexibility, options including providing the same display dimensions in a handheld device of smaller footprint or to increase the display dimensions in similar footprint, whilst moving the single feature touch-pad 300 to another surface essentially out of sight of the user, such as the rear surface or side of the handheld device, or optionally merging the two functions whilst maximizing display dimensions. An exemplary embodiment of such a device being shown in FIGS. 4B and 4C for a touch-pad enabled PDA 460. Referring firstly to FIG. 4B the first view 450 represents that of the viewer viewing the touch-pad enabled PDA 460. As such the user is holding the touch-pad enabled PDA 460 in their left hand 420 and is presented with a clear view of the enlarged display 470. Accordingly to this embodiment depicted within first view 450 the enlarged display 470 is now the majority of the footprint of the touch-pad enabled PDA 460.

Figure 4C:
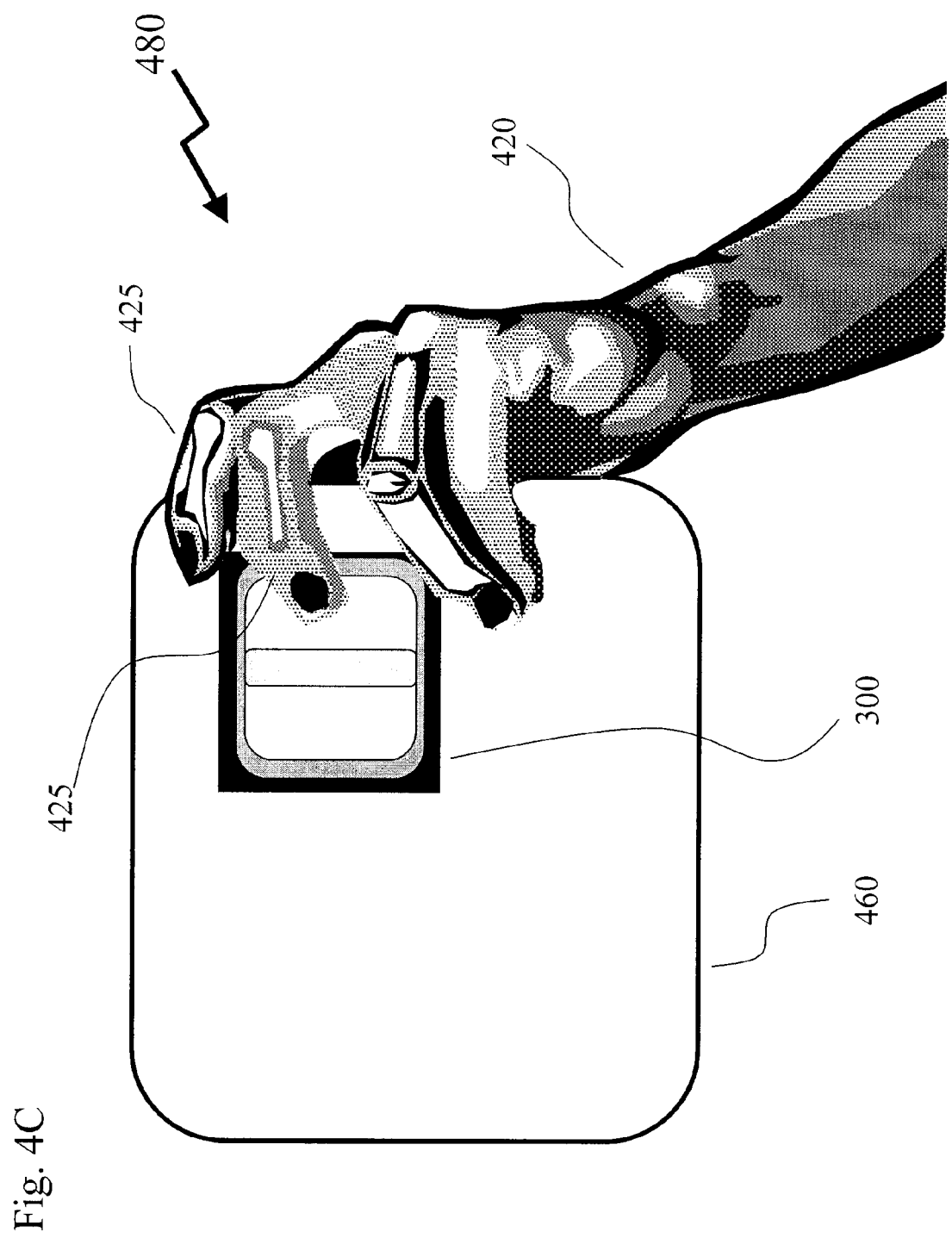
FIG. 4C illustrates a user employing the text entry means according to the first embodiment of the invention on the backside of the exemplary PDA of FIG. 4B.

Now referring to FIG. 4C the second view 480 is that of the user holding the touch-pad enabled PDA 460 but now from the viewpoint of a bystander in front of the user. Now the user's left hand 420 is shown gripping the touch-pad enabled PDA 460 with their fingers 425 on the rear surface of the touch-pad enabled PDA 460. In this user's middle finger 426 is in contact with the single feature touch-pad 400. As such the user is able to type text into the touch-pad enabled PDA 460 using their middle finger 426. Whilst the touch-pad enabled PDA 460 is shown with the single feature touch-pad 300 within a portion of the rear surface of the touch-pad enabled PDA 460 such placement and dimensions would be determined by the application, ergonomics and design elements of the touch-pad enabled PDA 460 overall. Accordingly variants may include, but are not limited to, larger single-feature touch-pads 300, multiple touch-pads for left or right hand use, or replacement with other embodiments of the invention as will be presented subsequently.

Such an exemplary second embodiment being presented in respect of the wide feature touch-pad 500. As such the touch pad surface 500E has a periphery feature 500F, vertical wide feature 500G, and horizontal wide feature 500H. These providing for the effective four quadrants 500A through 500D of the touch pad surface 500E of the wide feature touch pad 500.

Accordingly, the user is now able to engage the wide feature touch pad 500 in similar manner as that of the single feature touch pad 400 as shown in respect of FIG. 5B. Therefore considering the single short downward stroke 600a to the outer edge of quadrant 500A this is now three differentiable downward strokes, being one to the outside of the periphery feature 500F, one to the inside of the periphery feature 500F, equivalent therefore to single short downward stroke 453, and one on the periphery feature 500F. Further, with a directional change the single short upward stroke 451 is now three differentiable upward strokes. This overall group of 6 differentiable strokes being shown as stroke group 507. In this manner, the four quadrants 500A through 500D provide 12 short-stroke groups 501 through 512, each short-stroke group comprising three short-strokes in one direction and three short-strokes in the contrary direction. In this manner, short-strokes provide 72 differentiable strokes on the touch-pad, substantially more than all modes of the touch-pad assembly 400.

However, referring now to FIGS. 5C and 5D the user can further engage the wide feature touch pad 500 with long-stroke sets 521 through 526, and tap sets 531 through 551. Referring first to FIG. 5C long-stroke sets are those wherein the user moves their finger sufficiently far along the touch-pad surface such that the motion covers more than a single quadrant. Each long-stroke set further comprises three strokes in one direction, to one side, on top of, and to the other side of a wide feature, namely the periphery feature 500F, vertical wide feature 500G, and horizontal wide feature 500H. Also as with the short-stroke sets 501 through 512 each long-stroke set 521 through 526 comprises three contra-directional strokes such that a set is six differentiable strokes. Accordingly the six long-stroke sets 521 through 526 provide a further 36 differentiable strokes.

The tap sets 531 through 551 within the embodiment described with reference to FIG. 5D comprise quadrant tap sets 531 through 542 and corner tap sets 543 through 551. Each of the quadrant tap sets 531 through 542 comprising a tap to one side, on top of, and to the other side of a wide feature, namely the periphery feature 500F, vertical wide feature 500G, and horizontal wide feature 500H. These therefore provide a further 36 differentiable taps for the wide-feature touch-pad 500.

Finally, corner taps sets 543 through 551 represent a single tap at the junction of two of the wide features, namely the periphery feature 500F, vertical wide feature 500G, and horizontal wide feature 500H. This provides a further 9 differentiable taps. For some designs of the wide feature touch-pad 500 the corner tap sets may optionally be extended, not shown for clarity, such that corner taps 543, 545, 549, and 551 are three taps, one tap on the junction of the wide features, one on the inner corner, and one on the outer corner. A further expanded corner tap set provides a tap in every inner corner of the junctions of wide features and the external corners in addition to those on the wide feature, this not shown for clarity, but provides each of corner taps 543, 545, 549, and 551 as 3 taps, middle taps 544, 546, 548, and 550 as 4 taps, and central tap 547 as 5 taps.

As a result of the periphery feature 500F, single vertical wide feature 500G, and single horizontal wide feature 500H a large differentiable entry set exists to a user or application. These different combinations are presented below in Table 1.

TABLE 1

Character Combinations for Wide Feature Touch-Pad

|  | Strokes Differentiable | Extended Set | Further Extended Set |
|---|---|---|---|
| Short-Stoke Sets | 72 | 72 | 72 |
| Long-Stroke Sets | 36 | 36 | 36 |
| Quadrant Tap Sets | 36 | 36 | 36 |
| Corner Tap Sets | 9 | 17 | 33 |
| TOTAL | 153 | 161 | 177 |

One potential mapping of the differentiable strokes is shown below in Tables 2A through 2C. The potential mapping providing numbers along the central horizontal, alphabet along central vertical, and special characters as taps.

TABLE 2A

Short and Long Stroke Character Associations

| 501 | Above | L | A | 504 | Above | L | 7 | 507 | Left | N | B | 510 | Left | N | K |
|---|---|---|---|---|---|---|---|---|---|---|---|---|---|---|---|
|  |  | R | A |  |  | R | 8 |  |  | S | C |  |  | S | L |
|  | On | L | E |  | On | L | 9 |  | On | N | D |  | On | N | M |
|  |  | R | E |  |  | R | 0 |  |  | S | F |  |  | S | N |
|  | Below | L | I |  | Below | L | # |  | Right | N | G |  | Right | N | P |
|  |  | R | I |  |  | R | * |  |  | S | J |  |  | S | Q |
| 502 | Above | L | O | 505 | Above | L | F1 | 508 | Left | N | B | 511 | Left | N | K |
|  |  | R | O |  |  | R | F2 |  |  | S | C |  |  | S | L |
|  | On | L | U |  | On | L | F3 |  | On | N | D |  | On | N | M |
|  |  | R | U |  |  | R | F4 |  |  | S | F |  |  | S | N |
|  | Below | L | Y |  | Below | L | F5 |  | Right | N | G |  | Right | N | P |
|  |  | R | Y |  |  | R | F6 |  |  | S | J |  |  | S | Q |
| 503 | Above | L | 1 | 506 | Above | L | F7 | 509 | Left | N | B | 512 | Left | N | K |
|  |  | R | 2 |  |  | R | F8 |  |  | S | C |  |  | S | L |
|  | On | L | 3 |  | On | L | F9 |  | On | N | D |  | On | N | M |
|  |  | R | 4 |  |  | R | F10 |  |  | S | F |  |  | S | N |
|  | Below | L | 5 |  | Below | L | F11 |  | Right | N | G |  | Right | N | P |
|  |  | R | 6 |  |  | R | F12 |  |  | S | J |  |  | S | Q |
| 521 | Above | L | ~ | 522 | Above | L | , | 524 | Left | N | { | 525 | Left | N | R |
|  |  | R | ! |  |  | R | . |  |  | S | } |  |  | S | S |
|  | On | L | @ |  | On | L | , |  | On | N | [ |  | On | N | V |
|  |  | R | $ |  |  | R | . |  |  | S | ] |  |  | S | W |
|  | Below | L | % |  | Below | L | , |  | Right | N | : |  | Right | N | X |
|  |  | R | ^ |  |  | R | . |  |  | S | " |  |  | S | Z |
| 523 | Above | L | & |  |  |  |  | 526 | Left | N | ; |  |  |  |  |
|  |  | R | * |  |  |  |  |  |  | S | ' |  |  |  |  |
|  | On | L | ( |  |  |  |  |  | On | N | < |  |  |  |  |
|  |  | R | ) |  |  |  |  |  |  | S | > |  |  |  |  |
|  | Below | L | - |  |  |  |  |  | Right | N | ? |  |  |  |  |
|  |  | R | + |  |  |  |  |  |  | S | / |  |  |  |  |

TABLE 2B

Quadrant Tap Entry Character Associations

| 531 | Above | TAB | 534 | Above | Delete | 537 | Left | CTRL | 540 | Left | SHIFT |
|---|---|---|---|---|---|---|---|---|---|---|---|
|  | On | TAB |  | On | H |  | On | CTRL |  | On | SHIFT |
|  | Below | TAB |  | Below | Enter |  | Right | CTRL |  | Right | SHIFT |
| 532 | Above | CTRL | 535 | Above |  | 538 | Left | A | 541 | Left | O |
|  | On | CTRL |  | On |  |  | On | I |  | On | U |
|  | Below | CTRL |  | Below |  |  | Right | E |  | Right | Y |
| 533 | Above | Back | 536 | Above | ENTER | 539 | Left | ALT | 542 | Left | CAP LOCK |
|  | On | T |  | On | ENTER |  | On | ALT |  | On | CAP LOCK |
|  | Below | Shift |  | Below | ENTER |  | Right | ALT |  | Right | CAP LOCK |

TABLE 2C

Corner Tap Entry Character Associations

| 543 | Diagonal Left-Up | 544 | Up | 545 | Diagonal Right-Up |
|---|---|---|---|---|---|
| 546 | Left | 547 | Space | 548 | Right |
| 549 | Diagonal Left-Down | 550 | Down | 551 | Diagonal Right-Down |

Figure 6:
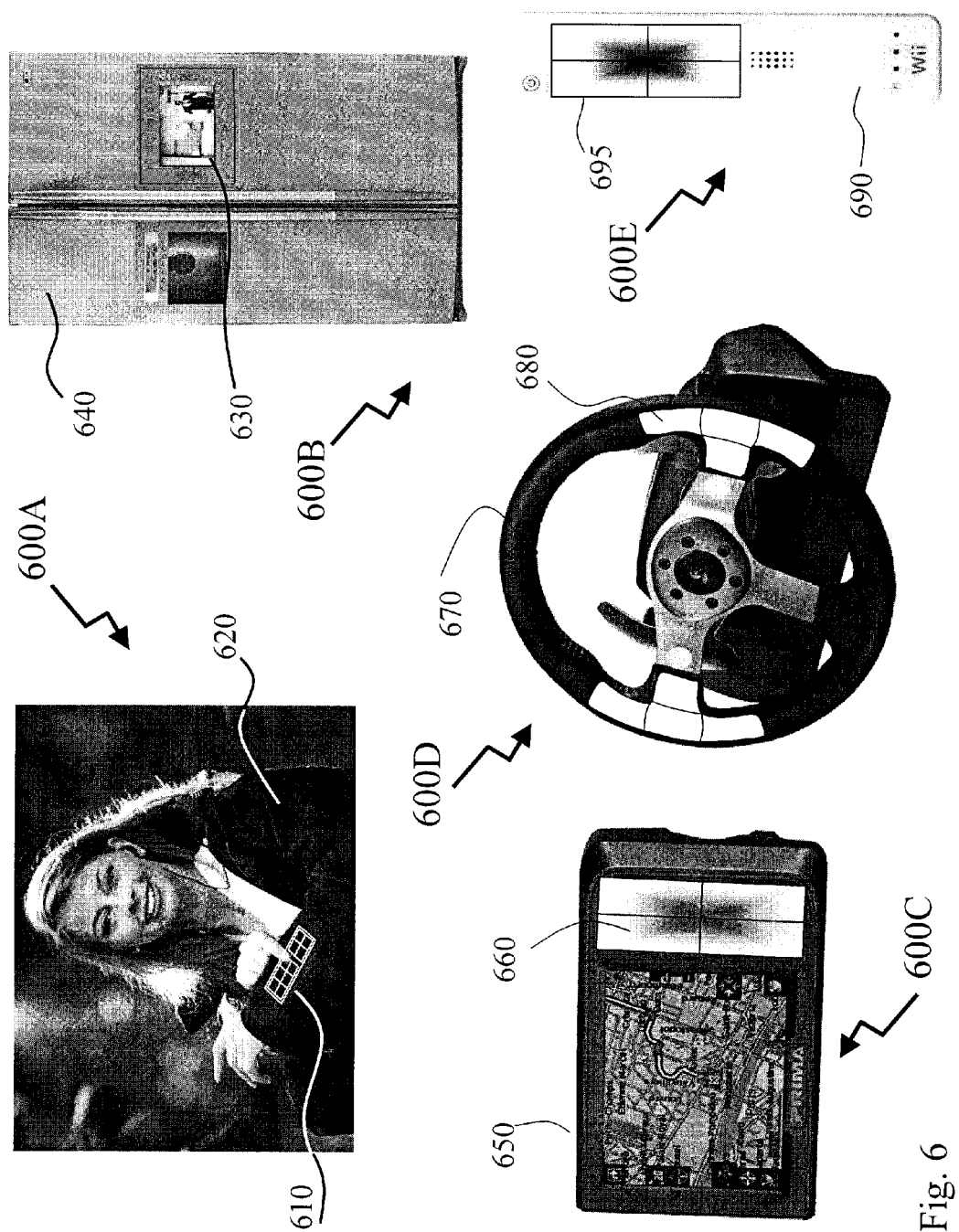
FIG. 6 illustrates exemplary incorporation of touch-pad interfaces according to the exemplary embodiments described in various consumer items.

According to the exemplary embodiments presented in respect of FIGS. 3 through 5D a user is provided with a flexible data entry device rather than the fixed layout of the QWERTY keyboard. Referring to FIG. 6 some typical examples of the deployment for such a flexible data entry device are shown. Shown in 600A is a flexible touch-pad 610 embedded into the fabric of a users jacket 620, such a flexible touch-pad 610 allowing the user to interface with personal electronic devices such as MP3 players, PDAs, cellular telephones etc.

Now referring to 600B shown is a refrigerator 640 containing an LCD display 630. It will be apparent to one skilled in the art that such LCD displays 630 can be provided with integral touch-pad elements. In this manner the LCD display 630 can provide additional functionality allowing it to operate as an email messaging interface, Internet browser, etc as well as a television. Further the exemplary embodiments of the invention allow this functionality to be provided without interfering with the image presented to the user. As such a user could send an email or add to a grocery list whilst still watching their favorite sitcom.

Now referring to 600C is shown a Global Positioning System (GPS) 650 device supporting a touch-pad 660 allowing the user to enter rapidly and in detail their intended destination or perform a web based search to identify their destination. As entering such information, along with providing other input to devices for a driver is dangerous, unless they are stopped, a touch-pad 680 may be provided as part of the steering wheel 670 for a driver. In this manner the user may perform many aspects of their activities within a car, truck, or other motor vehicle. Such activities including, but not limited to adjusting their music player, answering their cellular telephone, dialing, or entering a target destination into their GPS device 650. Finally, shown in 600E is a controller 690 for a gaming device, not shown for clarity, which is typically provided with a limited number of buttons. However, the touch-pad 695 of the controller 690 allows the functionality of the controller 690 to provide web access, text entry as well as enhanced functionality within the gaming environment.

Figure 7:
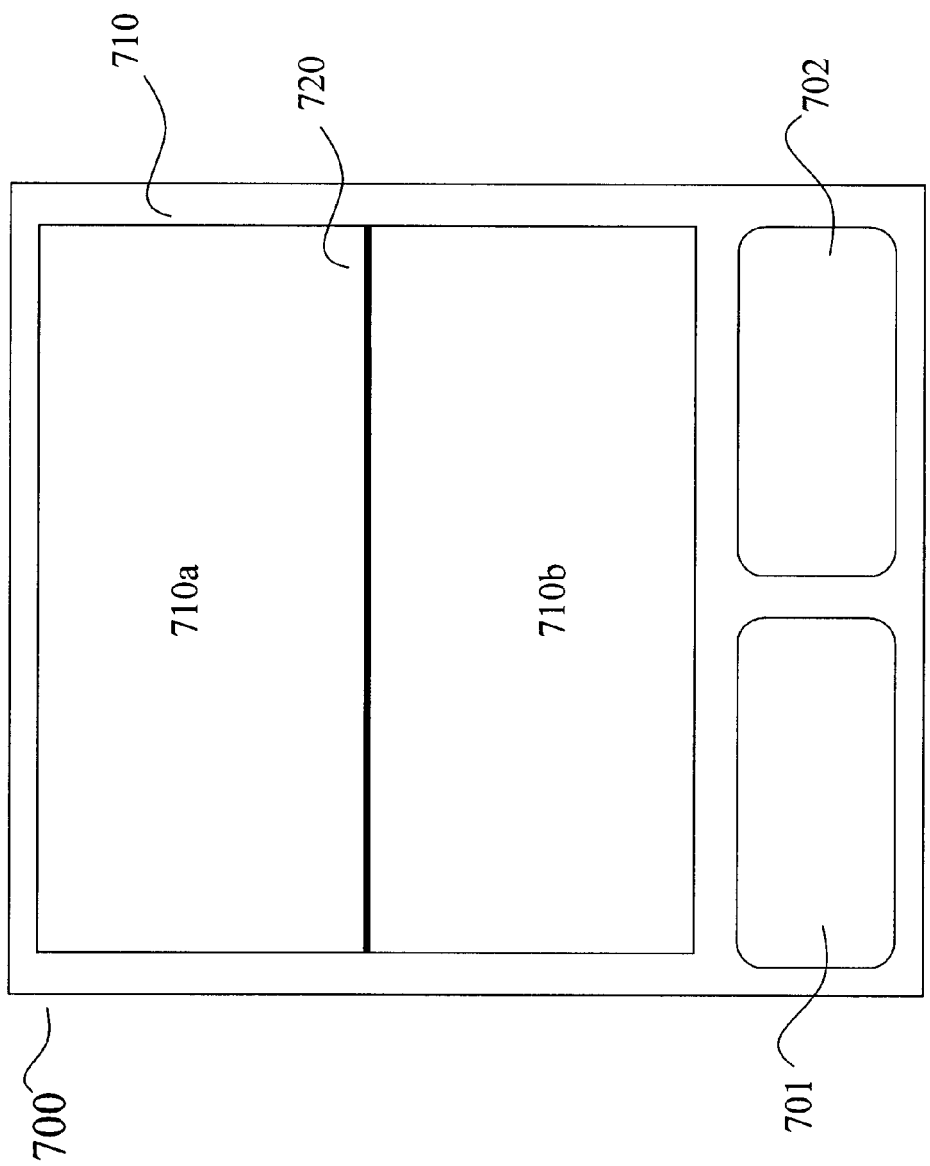
FIG. 7 illustrates a third embodiment of the invention wherein the touch-pad includes a single surface feature.

FIG. 7 illustrates a third embodiment of the invention wherein the touch-pad module 700 of an electronic device comprises a touch-pad 710, and buttons 701 and 702. As shown the touch-pad 710 includes a single surface feature 720, which defines an upper and lower touch-pad area, being 710*a* and 710*b*, respectively.

The single surface feature 720 provides a simple tactile differentiator allowing the user to have additional positional information of, for example a finger, relative to the touch-pad. It would also be evident to one skilled in the art that such a differentiator also provides enhanced selection of a function as the user can easily distinguish between one half or the other of the touch-pad, whether the touch-pad is visible or not, and therefore provide for two different actions from a single finger contact being in one half or the other. Equally a user's motion applied to one half or the other is differentiable as having different functions.

The single surface feature 720 presents a surface wherein a user optionally quickly and with little hesitation traces any numeral according to the same rules as used to display them with a seven-segment display such as commonly found in LCD or LED displays. As such the motion of a finger according to the "edges" of the upper and lower touch-pad areas 710*a* and 710*b* allows the translation of finger motion to a numeral.

Other embodiments exploiting the two sections of a touch-pad will be evident including the advantage that the interface allows for operation with a single finger, a single toe, a stylus held in the mouth or even a tongue. This provides for increased user data entry in situations wherein the user has a disability or facilitates the use of the added functionality in situations where such interfaces have not been possible today.

Figure 8A:
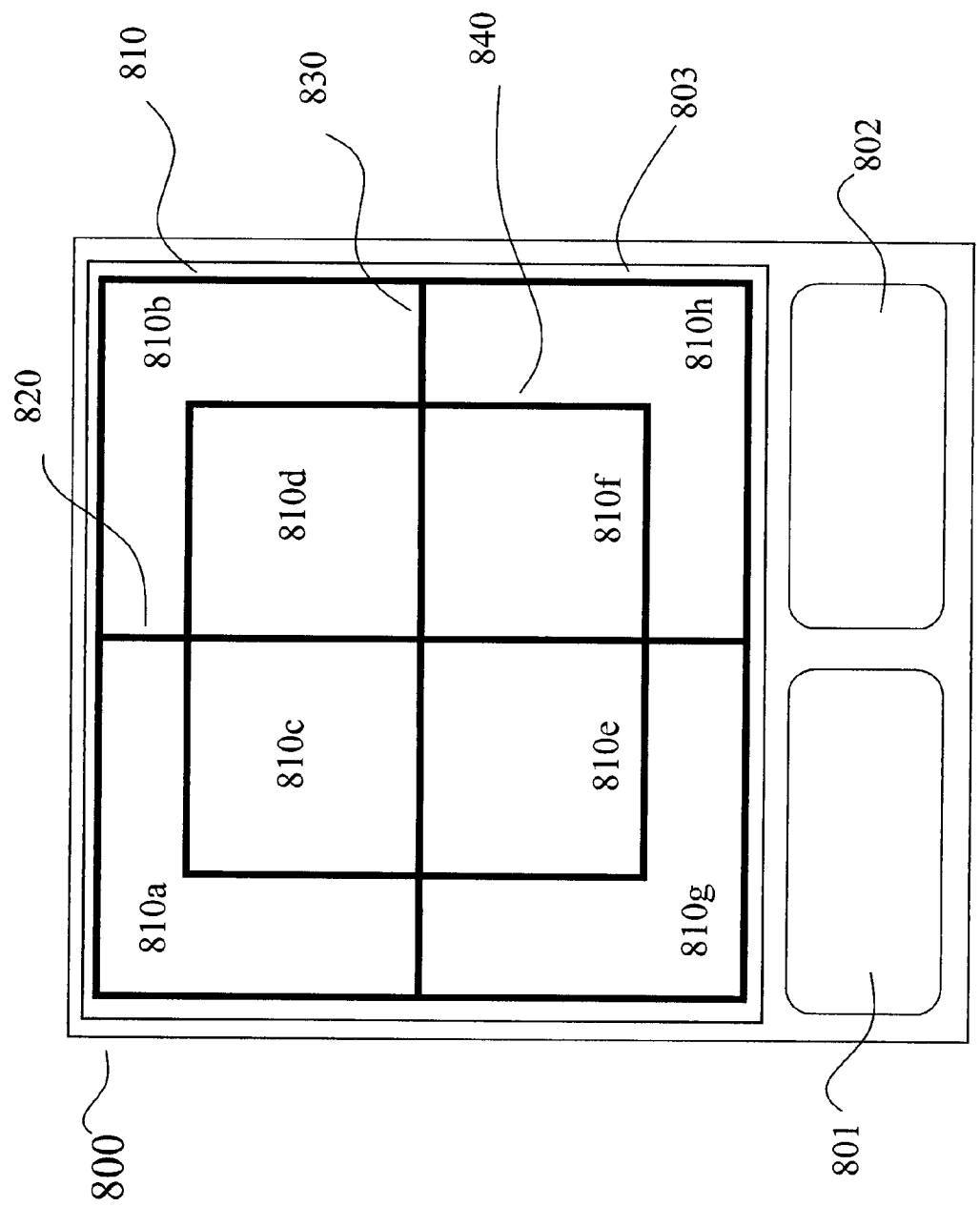
FIG. 8A illustrates a fourth embodiment of the invention wherein the touch-pad includes several surface features.

Referring to FIG. 8A, there is shown a fourth embodiment of the invention, wherein the touch-pad 803 of a user interface element 800, equivalent to the touch-pad 710 with single surface feature 720, is divided by a different arrangement of surface features 820, 830 and 840 as well as periphery surface feature 810. The conventional touch-pad of a computer comprising touch pad and two buttons is shown as the user interface element 800. The two buttons 801 and 802 provide a similar functionality through activation by a single-click or double-click, as with a computer mouse.

The user interface element 800 has a touch-pad surface 803 that is divided by four surface features 810, 820, 830, and 840. With the sensitivity of the human body these surface features 810 to 840 are provided as, for example, relatively small changes in the surface such as bumps or indents. Alternatively, these surface features comprise a small textured region as opposed to a predominantly smooth touch-pad surface 803.

As shown in the embodiment of FIG. 8A the surface features 810 to 840 result in the surface of the touch-pad 150 being divided into eight identifiable zones 810*a* to 810*h*. Without any visual indicator a user would become familiar with the segmented design of the touch-pad surface 803 and be able to place their finger, for example, into one of the specific identifiable zones 810*a* to 810*h* of the user interface element 800.

Now referring to FIG. 8B and FIG. 8C, an exemplary embodiment of the segmented touch-pad surface 803 is presented. The placing of surface features 820 to 840 allows a user to enter alphanumeric characters in both upper and lower case with ease.

Considering FIG. 8B, the translational motion of an object, for example a finger, along the first path 850, which includes motion in segments 810*b*, 810*a*, 810*g*, 810*e*, 810*f*, and 810*h* in sequence, is recognized and associated with, for example, an upper case "S".

Considering FIG. 8C, the translational motion through segments 810*d*, 810*c*, 810*e*, and 810*f*, including vertical and horizontal motion within segments 810*c* and 810*f*, is recognized by a processor in data communication with the touch-pad 803 as, for example, a lower case "s".

One skilled in the art will appreciate that this association of motions with specific sectors as well as the sequence of sectors allows for a user to enter all upper and lower case characters as well as numeric data from the keypad without recourse to multiple overlays or flexible membranes. Also motion associated with special characters such as "@" and "$" is optionally described simply according to the sectors and motions within specific sectors.

Clearly, the embodiment as shown allows for the user to define and/or modify sequences according to individual preferences, left or right-handedness, disability and so forth. Additionally touch-pad 820 provides for multiple actions such as operating as an array of toggle switches as a finger contact within a specific sector is now distinguishable as being intended to be within one segment of the touch-pad.

Further, it would be evident that the user data entry device can be of any shape, may in fact be hidden from the users view, and can be matched to a three-dimension surface to add further benefits. For example, it would be advantageous if the device could be applied to the reverse surface of a steering wheel allowing a user to access in-car navigation, music players, activate and operate their hands free cellular telephone without recourse to removing their hand or hands from the wheel, without requiring voice recognition or many, many switches on the steering wheel. The device could be on one surface of an arm-rest of a wheelchair allowing the user to control motion and enter text to a speech-generator, or it could be in the surface of a mouse allowing text entry without a keyboard, in the rear surface of a telephone allowing a user to speak and make notes simultaneously, or conference a third party without stopping conversation.

Figure 9A:
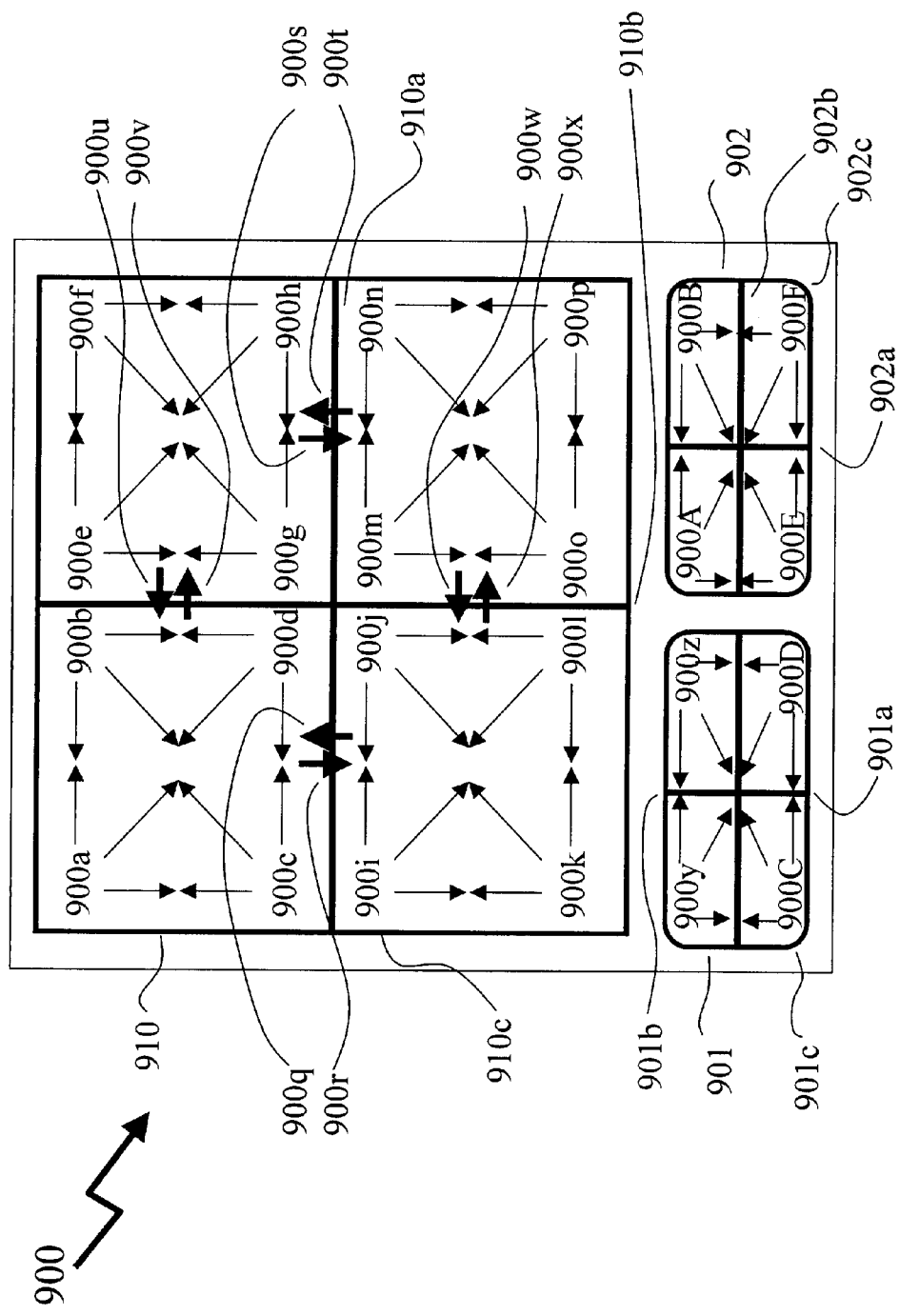
FIG. 9A illustrates a fifth embodiment of the invention wherein three touch-pads are provided, one of which having surface features.
Figure 9B:
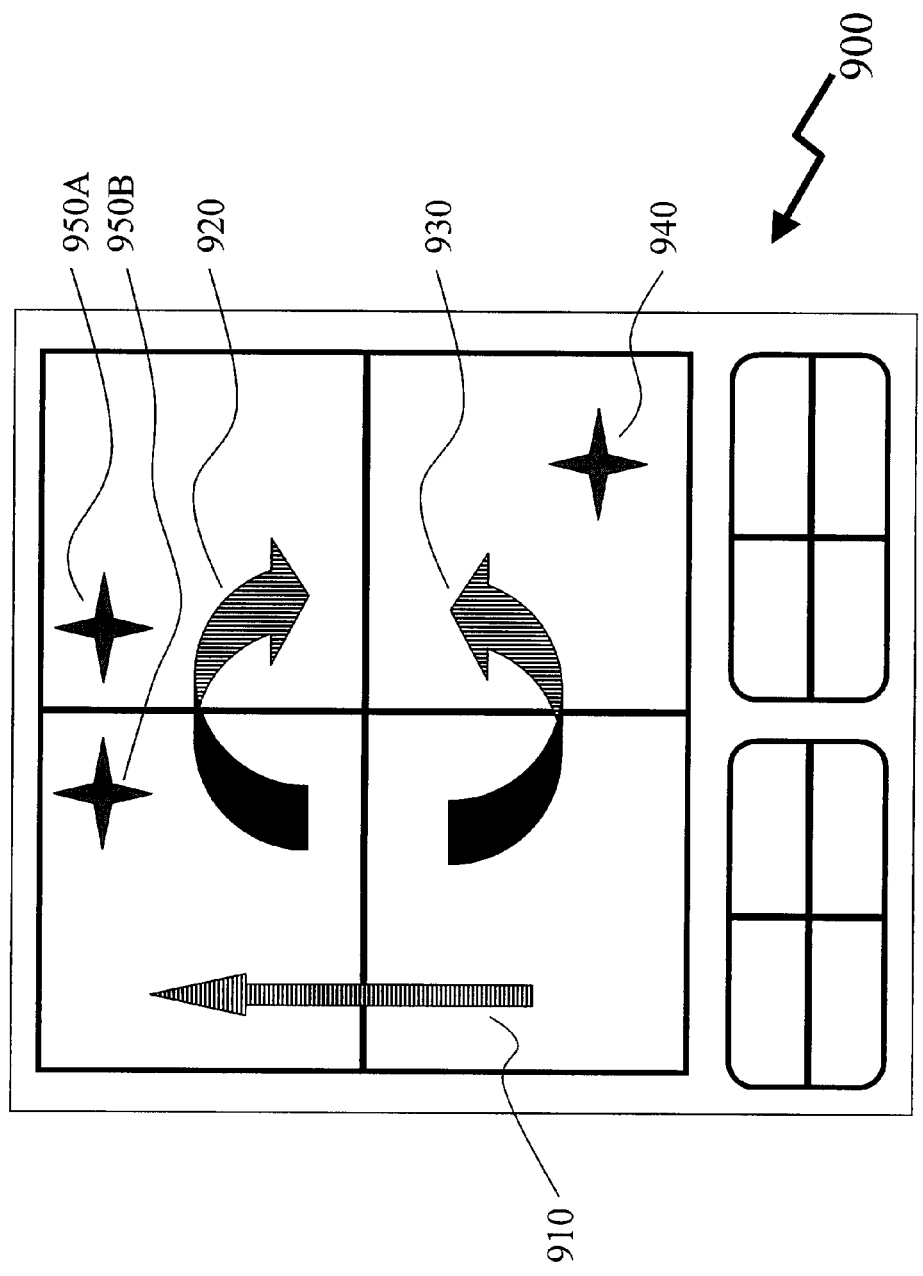
FIG. 9B illustrates possible stroke categorizations according to a touch-pad of the exemplary embodiments.

FIG. 9A illustrates a fifth embodiment of the invention wherein the two buttons 701 and 702 outlined in FIG. 7 for a variant of a typical two-button single touch-pad assembly 700, are replaced with second and third touch-pads 901 and 902 along with the first touch-pad 910 of the overall touch-pad assembly 900.

As shown, the first touch-pad 910 is defined by three surface features, the first being on its boundary 910c, and then surface features 910a and 910b which provide tactile feedback to the user such that they are able to orientate their finger into one of the resulting effective four quadrants of the first touch-pad 910. The control circuit (not shown) attached to the touch-pad assembly 900 is programmed to detect the location of first contact with an external surface such as a fingertip impressed thereon, to one of the touch pad surfaces 901, 902 and 910, and subsequent direction of motion of the fingertip while in contact therewith. Therefore, considering the first touch-pad 910, which has surface features 910a and 910b, and further considering each corner of a quadrant as an identifiable first touch point and then motion directed subsequently in horizontal or vertical directions then we arrive at the sub-set of motions, hereinafter referred to as strokes, as outlined below.

The result is for each quadrant a sub-set of eight such motions allowing for all 26 characters of the alphabet plus 6 special characters, as shown in the exemplary assignment table, Table 3, below these being "@", """, "'", "=", "+", and "-".

TABLE 3

Straight Motion Character Assignments

| 900 | a | Right | A | 900 | I | Right | Q |
|---|---|---|---|---|---|---|---|
|  |  | Down | B |  |  | Down | R |
|  | b | Left | C |  | j | Left | S |
|  |  | Down | D |  |  | Down | T |
|  | c | Up | E |  | k | Up | U |
|  |  | Right | F |  |  | Right | V |
|  | d | Up | G |  | l | Up | W |
|  |  | Left | H |  |  | Left | X |
|  | e | Right | I |  | m | Right | Y |
|  |  | Down | J |  |  | Down | Z |
|  | f | Left | K |  | n | Left | @ |
|  |  | Down | L |  |  | Down | " |
|  | g | Up | M |  | o | Up | ' |
|  |  | Right | N |  |  | Right | = |
|  | h | Up | O |  | p | Up | + |
|  |  | Left | P |  |  | Left | - |

If we now additionally allow for the recognition of diagonal motion from each initial touch-pad then we arrive at 12 identifiable and distinct strokes per quadrant, or 48 for the first-touch pad 910.

TABLE 4

Diagonal Motion Character Assignments

| 900 | a | Right | A | 900 | I | Right | Q |
|---|---|---|---|---|---|---|---|
|  |  | Diagonal | 1 |  |  | Diagonal | 9 |
|  |  | Down | B |  |  | Down | R |
|  | b | Left | C |  | j | Left | S |
|  |  | Diagonal | 2 |  |  | Diagonal | 0 |
|  |  | Down | D |  |  | Down | T |
|  | c | Up | E |  | k | Up | U |
|  |  | Diagonal | 3 |  |  | Diagonal | # |
|  |  | Right | F |  |  | Right | V |

TABLE 4-continued

Diagonal Motion Character Assignments

|  | d | Up | G |  | l | Up | W |
|---|---|---|---|---|---|---|---|
|  |  | Diagonal | 4 |  |  | Diagonal | $ |
|  |  | Left | H |  |  | Left | X |
|  | E | Right | I |  | m | Right | Y |
|  |  | Diagonal | 5 |  |  | Diagonal | % |
|  |  | Down | J |  |  | Down | Z |
|  | F | Left | K |  | n | Left | @ |
|  |  | Diagonal | 6 |  |  | Diagonal | & |
|  |  | Down | L |  |  | Down | " |
|  | g | Up | M |  | o | Up | ' |
|  |  | Diagonal | 7 |  |  | Diagonal | * |
|  |  | Right | N |  |  | Right | = |
|  | h | Up | O |  | p | Up | + |
|  |  | Diagonal | 8 |  |  | Diagonal | ! |
|  |  | Left | P |  |  | Left | - |

With this mapping the user is now able to enter all 26 characters, 10 numerals, and "#", "$", "%", "@", "&", """, "'", "*", "=", "+", "!", and "-", for example, as shown in Table 4 above.

Similarly, if the second touch-pad surface 901 has three surface features 901a to 901c, the user can access a further 12 strokes. This is shown as only twelve by considering the second touch-pad surface 901 to be small and as such the surface features 901a to 901c allowing the user to resolve the different corners and diagonal motions with some limits. Similarly the third touch-pad surface 902 is shown with surface features 902a to 902c giving a further 12 identified strokes. In this manner the three touch-pads 901, 902, and 910 as shown result in 72 different and distinct "strokes" by a user. This allows for all 26 characters, ten numerals, 30 standard special characters for a typical QWERTY keyboard, ~ ! @ # $ % ^ & * ( ) _ + | - = \ [ { ] } ; : ' " , < . > / ?, together with the additional keys of CAPS LOCK, ALT, TAB, CTRL, SHIFT and ENTER. Essentially the complete standard keyboard has been mapped to a simple touch-sensitive pad.

At this point all "strokes" from the user have been within a single portion of the touch-pad surface, such as first touch-pad surface 910, within three surface features, such as boundary 910c and surface features 910a and 910b. If these three surface features 910c, 910a, and 910b, were small perturbations, as would be sufficient for tactile sensing with a human finger, then optionally the "stroke" set can be expanded even further by considering "strokes" that cross from one region of the first touch-pad surface 910 to another. As shown with the first touch-pad surface 910 this provides another 8 "strokes" 900q through 900x. Within the exemplary embodiment of FIG. 9A the second and third touch-pad surfaces 901 and 902 do not provide these additional cross-feature "strokes" 900q through 900x, but these may be provided according to device requirements or software applications as the addition/deletion of these cross-feature "strokes" 900q through 900x.

Optionally the mapping of alphanumeric keys to the different strokes is flexibly defined, examples including but not limited to making the "stroke" definitions user selectable, defined by a language selected, the application in operation, or other criteria. Hence, a user operating in English might assign the vowels to the center, and most common consonants to the corners, whereas:

User A assigns the strokes to the Cyrillic alphabet;
User B assigns common mathematical symbols such as sum "Σ", square root "√", not equal "≠", and "greater than or equal "≧" in editing their mathematics thesis;
User C assigns Greek characters such as lower case alpha "α", beta "β", delta "δ", upper case delta "Δ", and upper case omega "Ω"; and User D assigns them to "fire", "bomb", "duck", "run", "stop", "walk" in their online multi-player game as they play on their cellular telephone.

Association of the touch-pad segments and finger motions is assignable in either a fixed or dynamic manner. The resulting actions are optionally textual entry, drawing, and numeric entry, and control functions for a game, machine or other system. A user by virtue of being presented with cues through touch onto the touch-pad adapts and learns to use such a touch-pad irrespective of its physical orientation to the user. As such the approach is adaptable to touch-pads of arbitrary shape and contour, with surface features determined by application, and are preferably placed according to optimum ergonomic use by the operator for that application.

In the embodiments described supra in respect of the first to fifth embodiments described in FIG. 3A through FIG. 9A the user provides a "stroke", described supra as in the form of a linear motion such as shown by linear move 910 of FIG. 9D upon a touch-pad assembly 900. The implementation of the touch-pad itself and the controller interfacing to it provide other user engagements in respect of entering information. Such engagements include that of taps 940, 950A and 950B, which provide additional functionality in respect of a touch-pad assembly 900 of limited dimensions. Optionally, a first "tap" 940 can be utilized within the touch-pad assembly 900, and as such be distinguishable from second and third "taps" 950A and 950B due to the users ability to orientate their finger with respect to the surface of the touch-pad assembly 900. Alternatively, controller interpreting the user input from the touch-pad assembly 900 could treat a pair of taps within a short timeframe in different sections of the touch-pad assembly 900, such as a user giving a second "tap" 950A followed by third "tap" 950B as a different form of command rather than a pair of commands.

The ability for the controller, not shown for clarity, of the touch-pad assembly 900 to interpret the users' motion on the surface can be extended to include circular motions, including the directionality of the circular motion. As such whilst a linear move 910 may be associated with an alphanumeric character entry, a first "tap" 940 with a special character entry such as a comma, period, semi-colon or quotation marks, and a multiple tap such as second and third "taps" 950A and 950B with a further special command, such as linefeed (also known as return or enter), the first and second circular motions 920 and 930 may be associated with application commands or keyboard modes. Hence, a user entering text for an electronic mail message may have employed a combination of entry forms onto the touch-pad assembly 900 to compose and send and email, but now wishes to switch to a top-level menu from which to now select a cellular telephone function, or optionally MP3 player, web browser or another feature of the multi-function multi-media device for which the touch-pad assembly 900 provides the user interface.

As such a first circular motion 920 is associated with an application being terminated and the user returning to a top level menu, whereas second circular motion 930 is associated with shutting the device down. In this manner the user is able to exploit their manual dexterity and the tactile feedback of the touch-pad assembly 900 to enable and engage the device in many ways such that different motions are associated with different functions, and further these functional associations may be varied either in response to user preferences, user disabilities, or even the application currently in operation.

Figure 10A:
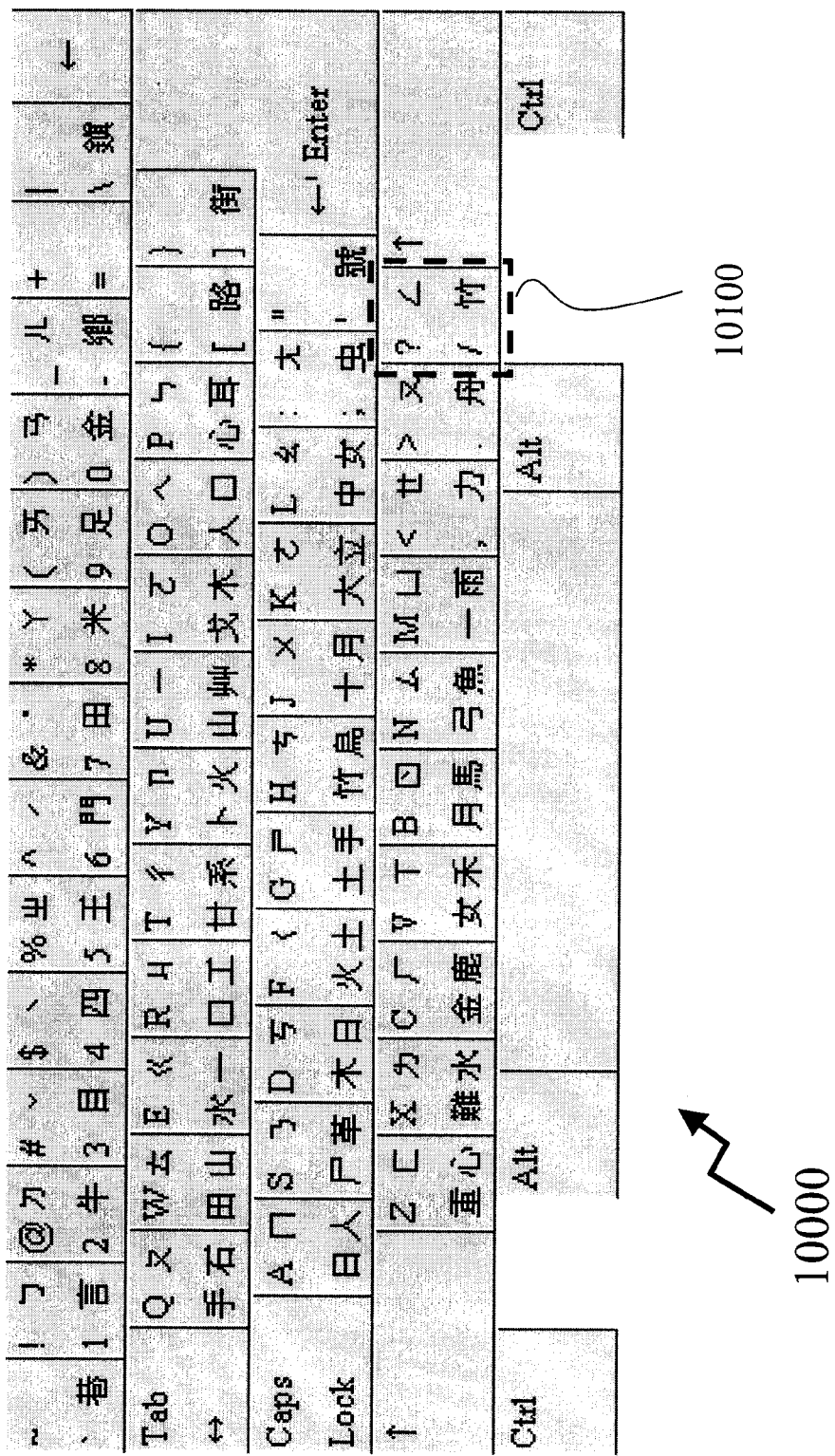
FIG. 10A illustrates a prior art keyboard providing Chinese traditional entry according to Zhuyin, Cangjie, and Dayi.

In describing the exemplary embodiments supra these have been described in respect to replacing the conventional QWERTY keyboard, such as QWERTY keyboard 260. However, referring to FIG. 10A a traditional Chinese keyboard 10000 is shown. Each key 10100 having four characters, first being in upper left a character from standard English keyboard, upper right are Zhuyin, lower left Cangjie, and lower right Dayi. As such the keyboard provides 180 characters, such that reducing this to a footprint such as the QWERTY keyboard is impractical in most cases. However, a touch-pad such as wide feature touch pad 700 according to the fifth embodiment provides 177 entries using the further extended set making it suitable for providing such a traditional Chinese keyboard 10000 on the different consumer devices of FIG. 6. Such Chinese character entry being previously impractical.

Figure 10B:
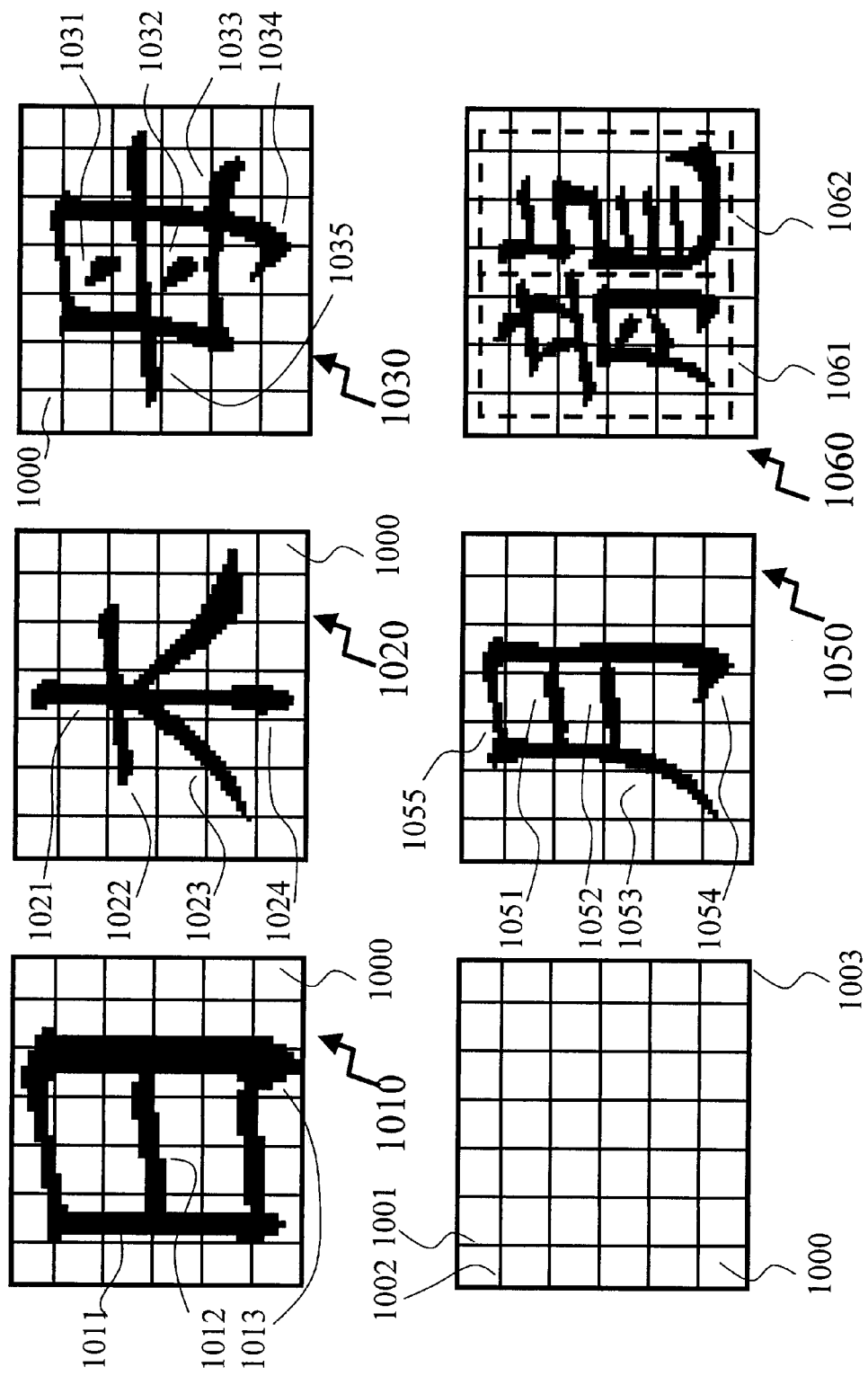
FIG. 10B illustrates an exemplary Chinese pictograph text entry touch-pad according to a sixth embodiment of the invention.

However, the Chinese "alphabet" according to the 1994 Zhonghua Zihai is over 85,000 characters, and as the Chinese "alphabet" is open new characters can be added over time. As such even the wide feature touch-pad 500 requires multiple character selections be merged to provide a reasonable portion of this character set. As discussed previously in respect of FIG. 9B the touch-pad 900 supports circular motions, which as presented were associated with application functions. However, as discussed the controller attached to the touch-pad assembly 900 provides an ability to re-associate these circular motions according to the application, which is presented in respect of a Chinese interface described in reference to FIG. 10B. As shown in FIG. 10 five exemplary Chinese character entries 1010 through 1060 are shown, using a touch-pad 1000 which is portrayed incorporating 6 vertical features 1001, 4 horizontal features 1002 in addition to the boundary feature 1003. The resulting touch-pad 1000 having 42 segments, however as will be seen in relation to FIG. 10B these provide either absolute referencing, or relational referencing, on the surface of the touch-pad 1000.

As such shown is a first Chinese character entry 1010, for the Chinese character rì representing sun is shown. As can be seen this has been generated from three user strokes on the touch-pad 1000. The first rì stroke 1011 being an upward motion with a subsequent right motion, the second rì stroke 1013 is then a downward motion with a subsequent left motion. The rì as the first Chinese character entry 1010 being completed with the third rì stroke 1012 being a single horizontal stroke across the middle of the touch-pad 1000. Not shown for clarity, being a final user stroke sequence of two "taps" within a same corner of the touch-pad 1000 as denoting completion of the first Chinese character entry 1010. Beneficially the vertical features 1001, horizontal features 1002, and boundary feature 1003 provide the user with a mental association of their fingers position relative to the touch-pad 1000 so that they can provide the first Chinese character entry 1010 with correct positioning of each rì stroke 1011 through 1013 relative to the others.

Similarly, second Chinese character entry 1020, for the Chinese character mù representing wood is shown. As can be seen this has been generated from four user strokes on the touch-pad 1000. The first mù stroke 1021 being a single upward motion, the second mù stroke 1022 a single horizontal motion, third mù stroke 1023 a left-right upward diagonal motion and fourth mù stroke 1024 is a left-right downward diagonal motion. Without the association referencing of a circular motion in respect of the user now being within an application for Chinese character entry the third mù stroke 1023 would, according to the embodiment described in respect of FIG. 9B, have been associated with an anti-clockwise circular motion similar to second circular motion 930 and hence a command to terminate the current application and return to the root menu. Similarly completion of the character entry being two "taps" within a same corner of the touch-pad 1000.

Now considering the third Chinese character entry 1030, for the Chinese character mŭ representing mother is shown. As can be seen this has been generated from five user motions on the touch-pad 1000. The first mŭ stroke 1033 being a combination of a downward motion with subsequent right upward motion, the second mŭ stroke 1034 being a right horizontal motion combined with a downward motion, and the third ma stroke 1035 a horizontal motion. These are then followed by two user dots, first user dot 1031 and second user dot 1032. The user by virtue of the vertical features 1001 and horizontal features 1002 being able to position the first and second user dots 1031 and 1032 separately on the touch-pad surface and displaced either side of their third mŭ stroke 1035. Again two "taps" within a same corner of the touch-pad 1000 denoting completion of the third Chinese character entry 1030.

Shown in the fourth Chinese character entry 1050 is the Chinese character yuè. Comparison of this fourth Chinese character entry 1050 with the first Chinese character entry 1010 for rì, illustrates the benefit of the vertical features 1001 and horizontal features 1002 for providing user positional information as many structural elements of the two characters are common and may be easily mistaken if the three rì strokes 1011 through 1013 are replaced with five yuè strokes 1051 through 1055. The relative location of the second and third yuè strokes 1051 and 1052 relative to the fourth and fifth yuè strokes 1053 and 1054 differentiation the fourth Chinese character entry 1050 from the first Chinese character entry 1010.

Chinese character entry becomes quite complex, such as represented by the fifth Chinese character entry 1060 representing long, Chinese dragon. As depicted this is a very complex character, which could optionally be entered as first and second character elements 1061 and 1062, each entered onto the full area of the touch-pad 1000 but associated due to single horizontal motion, not shown for clarity, made along the lower edge of the boundary feature 1003.

As presented in FIG. 10B in respect of the Chinese character entries 1010 through 1060 the horizontal features 1002 and vertical features 1001 provide the user with an ability to reference entry motions, such as rì strokes 1011 though 1013, or yuè strokes 1061 through 1065 relative to each other. In many instances the users' entry of strokes or taps does not necessitate such relative referencing, or optionally increased flexibility is provided to a user in location of their finger relative to a touch-pad such as a large area touch-pad 1100 as shown in FIG. 11.

Such a large area touch-pad for example being incorporated into a domestic refrigerator, such as the LG LSC27990 Refrigerator 640 with LCD TV (650) and WeatherPlus Information Center depicted in FIG. 6. Such devices allowing, for example, the consumer to enter items onto a shopping list or order list with an online retailer directly, or potentially have the LG LSC27990 Refrigerator 640 automatically re-order depending upon sensor information such as weight of a milk container, quantity of eggs within the egg tray, etc. In such cases it is desirable to allow the user a "start-anywhere" feature, especially allowing accommodation of different statures of individuals within the households' family that can include children, adults and the elderly.

Figure 11:
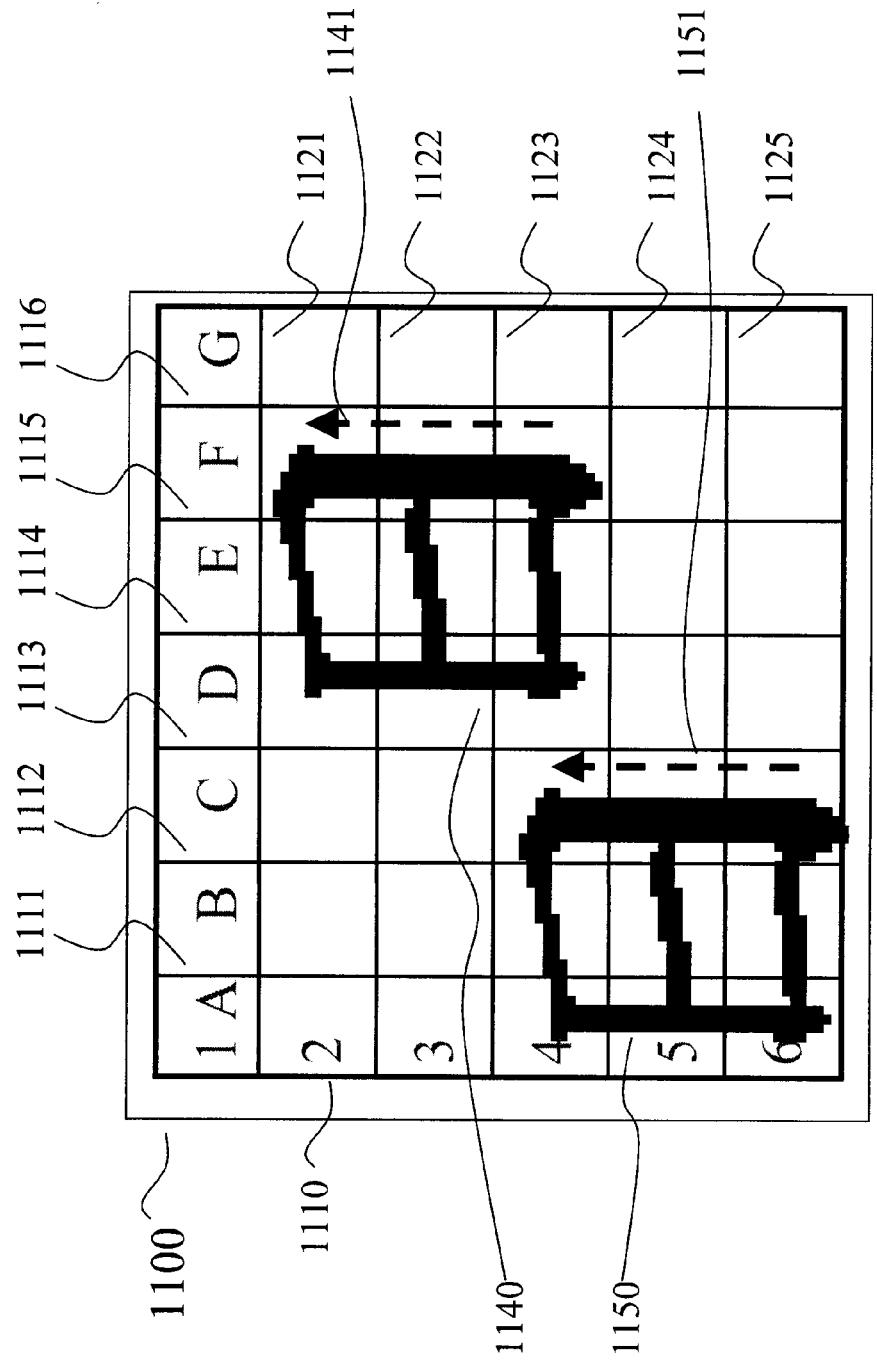
FIG. 11 illustrates an exemplary touch-pad supporting a start anywhere touch-pad according to a sixth embodiment of the invention.

As shown in FIG. 11 the large area touch-pad 1100 comprises a boundary feature 1110, vertical features 1111 through 1116, and horizontal features 1121 through 1125. As indicated these features provide an effective horizontal grid of 7 segments A through G and six rows 1 through 6. Now consider an adult user entering the rì character 1140, with an initial stroke 1141 beginning at grid F4 and ending F2, and that the complete rì character 1140 is entered within the 9 element grid region D2 through F4. In this example, the rì character 1140 being associated by a family as representing "need to order milk".

Now consider a child wishing to denote the same "need to order milk" but who due to their reduced height cannot reach rows 2-3 of the large-area touch-pad 1100. Rather than require the child to stand upon a stool or box and enter the rì character 1140 the "start-anywhere" aspect of the large area touch-pad 1100 allows them to enter a second rì character 1150 starting with the second initial stroke 1151 which begins at grid C6 and ends at C4, with the entire second rì character 1150 within a second 9 element grid region defined by A4 through C6. As such the controller associates the sequence of key strokes rather than their absolute position.

Advantageously, this feature not only enhances the incorporation of such touch-pad elements into the LCD TV 630 of the LG LSC27990 Refrigerator 640 of FIG. 6 but also into other consumer items such as the smart jacket 620. As shown the smart jacket 620 incorporates a flexible touch-pad 610 within the sleeve of the smart jacket 620. Such a flexible touch-pad for example interfacing to an MP3 player, cellular telephone, or PDA of the user which is stored in an inner pocket of the smart jacket 620 or another item of the users clothing. Then in wishing to use the electronic device, not shown for clarity, without opening their jacket and interfacing directly with the electronic device as it is raining, windy, snowing, etc the user simply uses the flexible touch-pad 610.

With today's low cost wireless interfaces the flexible touch-pad 610 may optionally be interfaced to the users electronic devices by a wireless means such as a Bluetooth™ interface.

Figure 12:
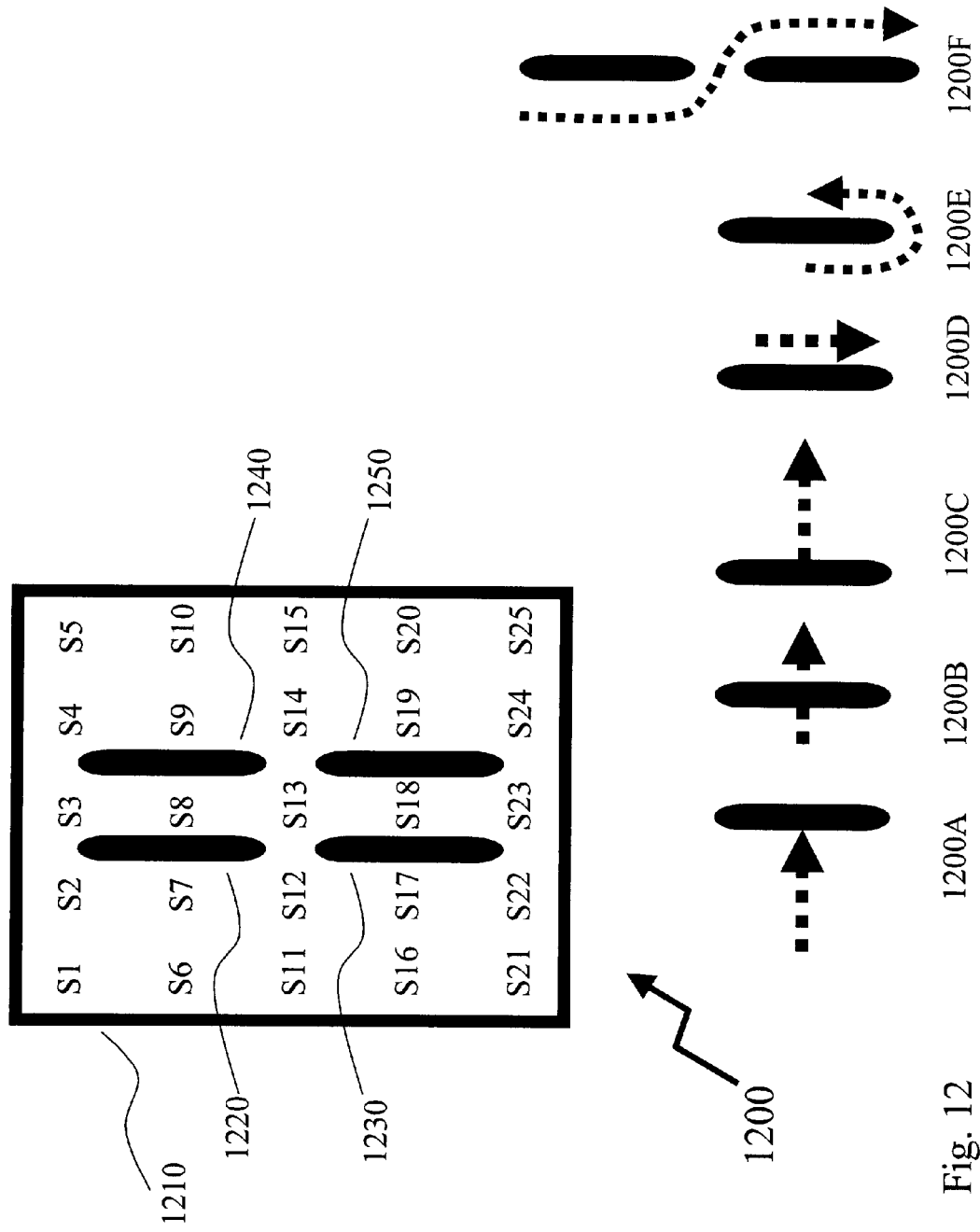
FIG. 12 illustrates an exemplary touch-pad supporting additional user motions according to a seventh embodiment of the invention.

Now referring to FIG. 12 a touch-pad entry device according to a seventh embodiment of the invention is provided, allowing additional motions to be captured. As shown a touch-pad 1200 has a boundary 1210, and four linear surface features 1220 to 1250. Each of the linear surface features 1220 to 1250 is a discrete surface feature unlike the previous features which each formed part of continuous sub-boundaries within their respective touch-pads. Accordingly, the user (not shown for clarity) is provided with the same tactile feedback allowing them to orientate their finger, for example. Accordingly, a user could resolve 25 locations within the touch-pad 1200, which are shown as locations S1 through S25.

Accordingly, therefore the user may enter text, characters, or numerals using the motions presented previously in respect of FIGS. 3A and 5A through 5D for example. In this manner simple short parallel strokes 1200D, parallel to a feature such as the boundary 1210 or surface features 1220 through 1250 at each of the locations S1 through S25, provide for the A-Z characters of the Latin alphabet. However, other motions are also possible such as a perpendicular stroke 1200A towards one of the surface features 1220 to 1250, an up-and-over stroke 1200B that traverses from one side of a surface feature 1220 to 1250 to the other side of the feature, a perpendicular stroke 1220C away from one of the surface features 1220 to 1250. Further motions are also possible such as the end-loop 1200E, wherein the user traces around one end of a discrete feature such as surface feature 1220, and the pass-through 1200F wherein the user motion progresses initially parallel to one surface feature, such as surface feature 1220, and then moves through the gap between two surface features, before continuing linearly down the other side of the next feature, surface feature 1230.

The exemplary touch-pad 1200 also supports the entry of information into an electronic device through the use of pictographs. For example, a user moving their finger from S21 to S3, and thence to S25, S14, and S12 would have traversed a path representing the pictograph "A".

In this manner the different embodiments of the invention allow for a data entry device to really exploit the capabilities of the human mind to associate abstract concepts in a spatial manner, and leverage the incredible sensitivity of the human skin to provide tactile feedback such that a single small entry device can be exploited for multiple entry formats and multiple characters.

The provision of tactile feedback to the user allows the touch-pad as outlined in the embodiments to be used by users with visual disabilities, visual impairments, and dyslexia. It will also be evident that the touch-pad does not have to be visible to even a visually able user allowing the touch-pad to be positioned onto the rear surface of electronics devices such as cellular telephones, PDAs, and MP3 players as well as onto a wide range of objects such as steering wheels, joysticks, doorknobs, handles, and grips. In some instances therefore the touch-pad allows for security credential entry directly through the normal handle or grip rather than an additional discreet keyboard.

Whilst the exemplary embodiments of the invention have been described with respect to a touch-pad employing conventional sensing principles and design as current prior art touch-pads the invention may be applied to any touch-pad design, such as a flexible plastic touch-pad on a user's jacket or a touch-screen TV. Optionally, the approach can exploit physical features that have different physical attributes, such as an abrupt hard feature where a boundary is defined, and rounded, soft features within the general surface of the touch-pad. Optionally, features may be incorporated within the touch-pad that change an aspect physically in response to an applied force or applied electrical signal. Such an aspect being the displacement of their upper surface from the remainder of the touch-pad surface, wherein an electrical signal may trigger a feature to be raised or depressed relative to the touch-pad surface. In this manner the surface of the touch-pad may be made adaptable to the application or function currently in execution within the electronic device of which the touch-pad is part.

As such it is possible to consider such elements within a touch-pad that dynamically adjusts the number and placement of physical features in response to a control signal such as generated by a user's preference. For example, an adult with high motor coordination skills may select a fine grid such as presented in respect of FIG. 9A allowing them a large range of characters and functions, or an elderly user with restricted motor skills may select a simpler grid such as that depicted in FIG. 3A or FIG. 7. Further, the controller may dynamically reallocate motions according to the orientation of the touch-pad, or more generally the electronic device of which the touch-pad is a portion.

For example, a user with a wide-screen display on an MP3 player viewing photographs may rotate the MP3 player according to their viewing of a portrait image or a landscape image. As such the controller may dynamically re-associate horizontal and vertical motions on the touch-pad according to orientation of the electronic device so that a user used to a single horizontal stroke for accessing the next image does not need to remember they have now re-orientated the electronic device to view a portrait and now provide a vertical stroke to access the next image. Similarly, a stroke on the pad when the electronic device is stationary denotes "pick" whereas the same stroke when the pad is in motion denotes "release". Alternatively, the controller may re-associate the touch-pad in function, layout and stroke style depending upon other aspects of the device orientation to the user, such as is the user viewing an image on the screen on a different side of the device to the touch-pad, or holding the device to their ear, and in either case they cannot see the touch-pad.

As described in the embodiments the user selected input data signals are generated to an electronic device in response to the users' motion of their finger or fingertip when in contact with the surface of a touch-pad. It will be evident that the invention is compatible with a variety of touch-pad formats that will provide the required functionality, including electrical contact, membrane switches, capacitance based touch-pads, thermally sensitive pads, and optical position detectors. It will be further evident that the approach allows for the touch-pad to be operated with other parts of the human body, such as toe, tongue, and nose, as well as other implementations such as a style held between toes or within the mouth. All provide the tactile feedback to the user and allow the data entry device to be used by individuals with a wide range of disabilities, the touch-pad being further adaptable to the requirements of the user. Further, whilst the surface features have been presented as single linear elements it would be evident that they may be formed from other linear functions, such as arcs, or may be a series of dots.

Numerous other embodiments may be envisaged without departing from the spirit or scope of the invention.

What is claimed is:

1. A method for entering information comprising;
   contacting at a contact point a pad comprising a tactile feature;
   receiving from the tactile feature distinguishable tactile feedback relating to the contact point within the pad;
   sensing the contact point to provide location data;
   determining based on the location data, motion of the contact point relative to the tactile feature of the pad; and,
   providing a value in dependence at least upon the determined motion relative to the tactile feature of the pad.

2. A method according to claim 1 wherein,
   determining motion comprises determining the motion in dependence upon a direction and at least one of a duration, velocity and length of the determined motion relative to the tactile feature.

3. A method according to claim 1 wherein,
   determining motion comprises determining the motion in dependence upon a detected location of the contact point relative to the tactile feature.

4. A method according to claim 1 wherein,
   contacting is performed with at least one of a finger, a thumb, a toe, a tongue, and a stylus placed in at least one of contact and proximity with the pad.

5. A method according to claim 1 wherein,
   contacting at a contact point a pad is performed other than when a user sees the contact point.

6. A method according to claim 1 wherein,
   the pad comprises at least one of touchpad, position detector, and touchscreen.

7. A method according to claim 1 wherein,
   the distinguishable tactile feedback is for providing a user with an indication of where the user is contacting the pad.

8. A method according to claim 1 wherein,
   the distinguishable tactile feedback comprises a variation in surface texture from a first location to a second location.

9. A method according to claim 1 wherein,
   the distinguishable tactile feedback comprises providing a perturbation of the surface of the pad.

10. A method according to claim 9 wherein,
providing the perturbation of the surface comprises providing at least one of an indentation into the surface of the pad and a protrusion from the surface of the pad.

11. A method according to claim 10 wherein,
the distinguishable tactile feedback comprises a protrusion at least one of integrated within the pad, attached to the pad, and inserted between at least two sensing pads forming part of the pad.

12. A method according to claim 11 comprising,
providing a processor, the processor for providing to the pad at least a tactile control signal, the tactile control signal generated in dependence upon at least one of the determined motion and a command from the electronic device; wherein an aspect of the tactile feature is adjusted in dependence upon the tactile control signal.

13. A method according to claim 12 wherein,
adjusting an aspect of the tactile feature comprises adjusting a position of an upper surface of the tactile feature relative to the surface of the pad absent the tactile feature.

14. A method according to claim 10 wherein,
the protrusion comprises a ridge extending along a fixed path.

15. A method according to claim 10 wherein,
the protrusion comprises a ridge extending along a fixed straight path.

16. A method according to claim 1 wherein,
providing the tactile feature comprises providing a surface element that senses the contact point.

17. A method according to claim 1 wherein the value provided in dependence at least upon the determined motion is reflective of a symbol.

18. A method according to claim 1 wherein,
determining motion comprises distinguishing between motion along a single side of the tactile feature and motion from one side of the tactile feature to another side.

19. A method according to claim 1 wherein,
determining motion comprises determining a direction of the motion relative to the tactile feature.

20. A method according to claim 1 wherein,
the pad comprises a plurality of tactile features.

21. A method according to claim 1 wherein,
the pad comprises a tactile feature that is deformable.

22. A system for entering information to an electronic device comprising;
a pad comprising a sensing portion and a tactile feature surrounded by the sensing portion of the pad providing distinguishable tactile feedback to a user of the pad when an object controlled by the user is in contact with the tactile feature, the feedback relating to a specific location of the object, and a sensor for detecting at least one of a position and motion of the object controlled by the user relative to the pad and within the sensing portion; and
a controller for determining and communicating to the electronic device a value in dependence upon the at least one of a position and motion relative to the tactile feature of the pad.

* * * * *